United States Patent [19]
Aoki et al.

[11] Patent Number: 5,970,045
[45] Date of Patent: Oct. 19, 1999

[54] OPTICAL DISC AND DISC CARTRIDGE

[75] Inventors: Sunao Aoki; Nobuhiko Tsukahara; Toshiharu Okanishi, all of Kanagawa, Japan

[73] Assignee: Sony Corporation, Tokyo, Japan

[21] Appl. No.: 08/819,658

[22] Filed: Mar. 17, 1997

[30] Foreign Application Priority Data

Mar. 21, 1996 [JP] Japan .................................. 8-064998

[51] Int. Cl.⁶ .................................................. G11B 3/70
[52] U.S. Cl. .......................................................... 369/291
[58] Field of Search .............................. 369/263, 275.1, 369/275.2, 275.5, 77.1, 77.2, 280, 281, 282, 283, 286, 287, 290, 291; 360/60, 133, 132; 428/64.2, 64.3, 65, 694 R, 913

[56] References Cited

U.S. PATENT DOCUMENTS

| | | | |
|---|---|---|---|
| 3,833,185 | 9/1974 | Talavera | 242/199 |
| 4,618,060 | 10/1986 | Tarter | 206/444 |
| 4,692,831 | 9/1987 | Suzuki | 360/133 |
| 4,785,370 | 11/1988 | Ashe et al. | 360/133 |
| 4,805,769 | 2/1989 | Soltis et al. | 206/309 |
| 4,863,031 | 9/1989 | Tanaka et al. | 206/444 |
| 4,908,817 | 3/1990 | Sandell et al. | 369/291 |
| 4,916,567 | 4/1990 | Grobecker et al. | 360/133 |
| 5,150,354 | 9/1992 | Iwata et al. | 369/291 |
| 5,530,691 | 6/1996 | Fujisawa | 369/291 |
| 5,699,209 | 12/1997 | Koizumi | 360/96.5 |

FOREIGN PATENT DOCUMENTS

| | | |
|---|---|---|
| 26 38 738 | 3/1977 | Germany . |
| 6-203409 | 7/1994 | Japan . |

*Primary Examiner*—William J Klimowicz
*Assistant Examiner*—Kenneth W Fields
*Attorney, Agent, or Firm*—Jay H. Maioli

[57] ABSTRACT

An optical disc and a disc cartridge for accommodating the optical disc, wherein the disc cartridge accommodates a disc non-symmetrical in cross-section relative to the center of thickness of the disc, in which disc cartridge includes a main cartridge body portion and an opening/closure mechanism. The main cartridge body portion has an aperture via which to insert or take out the disc. The main cartridge body portion is configured for accommodating the disc only in the regular state of the disc which permits recording and/or reproduction of the disc. The opening/closure mechanism opens or closes the aperture.

12 Claims, 10 Drawing Sheets

OPTICAL DISC AND DISC CARTRIDGE

BACKGROUND OF THE INVENTION

1. Field of the Invention

This invention relates to an optical disc and a disc cartridge. More particularly, it relates to an optical disc and a disc cartridge employing two disc substrates.

2. Description of the Related Art

Recently, in keeping up with the increasing recording density of information signals, a sole bonded optical disc, in which two disc substrates for optical discs, such as compact discs (CDs), or magneto-optical discs, each formed by a single disc substrate, are bonded together to form a single disc. This bonded disc is composed of two disc substrates of the same design specifications with the signal recording surfaces facing to the outside. The signal recording surfaces are formed on the front and back sides of the bonded disc.

Among the bonded optical discs, there are such discs in which a signal recording layer is formed only on one disc substrate, while the other disc substrate performs the role of assuring the mechanical strength of the first disc substrate. The bonded optical disc is housed within the disc cartridge for recording and/or reproducing information signals by a recording/reproducing apparatus.

This disc cartridge is comprised of a main body portion made up of a pair of cartridge halves, namely an upper cartridge half and a lower cartridge half, each in the shape of a shallow saucer, abutted and bonded to each other.

Within the interior of the main cartridge body portion is formed a disc housing section, larger in thickness than the optical disc and also larger in size than the outer size of the disc, delimited by an arcuate-shaped upstanding wall member. The disc is housed rotatably within the disc housing section.

In the upper and lower surfaces of the main cartridge body portion are formed recording and/or reproducing apertures extending from a center portion towards the front side at a mid portion in the left-and-right direction of the main cartridge body portion. These recording and/or reproducing apertures permit a portion of the recording area of the disc housed within the main cartridge body portion to be exposed to the outside.

On the main cartridge body portion is slidably mounted a shutter generally substantially U-shaped in cross-section. The shutter is comprised of a pair of shutter portions dimensioned to close the recording and/or reproducing apertures and a connecting portion interconnecting the shutter portion. This shutter closes the recording and/or reproducing apertures only when the disc cartridge is loaded on the recording and/or reproducing apparatus, while otherwise opening the recording and/or reproducing apertures. When out of use, the shutter prevents the dust and dirt from entering the inside of the main cartridge body portion while preventing the user's hand or fingers from touching the recording area of the disc.

The above-described bonded optical disc suffers from an inconvenience that, when the disc substrates are registered and bonded to each other in this state in the production process, there is produced a deviation in the relative positions of the disc substrates.

By this position deviation, produced at the time of bonding, the portions of inner dimensions E1, E2 of the center apertures of two disc substrates 420A, 420B represent an inner dimension E3 of the center aperture of a bonded optical disc 420. The result is the inconvenience that the offset of the outer dimension relative to the center apertures is increased if, for bonding the disc substrates 420A, 420B to each other, a reference shaft of a centering jig is passed through the center apertures of the disc substrates 420A, 420B for positioning.

When the bonded optical disc 420 is housed within a disc housing section 422 of a disc cartridge 421, as shown in FIG. 3, there is raised a problem that difficulties are encountered in assuring a clearance necessary between the inner peripheral wall section of the disc housing section 422 and the outer rim of the bonded optical disc 420.

In a disc cartridge, there are occasions wherein a double sided disc, in which a recording area ID provided on each side of the disc substrate for increasing the disc capacity so that both the front and back sides of the disc substrate perform the role ob the recording and/or reproducing surfaces, is housed therein. It has been proposed to construct the disc cartridge housing the disc so that the disc can be inserted into or ejected from the cartridge.

The disc cartridge is constructed so that, when recording and/or reproduction of the information signals on one of the recording surfaces thereof comes to a close, the disc cartridge is ejected once from the apparatus, reversed upside-down and re-inserted via a cartridge insertion aperture of the recording and/or reproducing apparatus.

With the above-described disc cartridge, having housed therein the disc for recording and/or reproduction, if recording and/or reproduction comes to a close and the next disc is recorded and/or reproduced, a new disc has to be exchanged for the disc for which recording and/or reproduction has come to a close. Since the disc is constructed to have the same outer size, it is difficult for the user to discern the desired recording and/or reproducing surface, such that the disc tends to be housed within the disc cartridge in the incorrect condition.

For example, if the disc is housed in the disc cartridge with the recording and/or reproducing side other than the desired side set to the reproducing side, and the disc cartridge is loaded in this state on the recording and/or reproducing apparatus for recording/reproduction, it may occur that the required information signals be inadvertently erased.

SUMMARY OF THE INVENTION

It is therefore an object of the present invention to provide an optical disc which resolves the above-described problem.

It is another object of the present invention to provide a disc cartridge which resolves the above-described problem.

An optical disc according to the present invention includes first and second disc substrates. The first disc substrate has a recording layer and is formed with a first center aperture. The second disc substrate has a recording layer and is formed with a second center aperture. The second disc substrate is bonded to the first disc substrate so that the respective recording layers face each other. The first center aperture or the second center aperture is larger in diameter than the remaining center aperture.

An optical disc according to the present invention includes first and second disc substrates. The first disc substrate has a reflective layer and is formed with a first center aperture. The second disc substrate has a reflective layer and is formed with a second center aperture. The second disc substrate is bonded to the first disc substrate so that the respective reflective layers face each other. The first center aperture or the second center aperture is larger in diameter than the remaining center aperture.

A disc cartridge according to the present invention accommodates therein a disc produced on bonding two disc substrates together. The disc is non-symmetrical in cross-sectional shape relative to the bonding surface as center. The disc cartridge includes a main cartridge body portion and an opening/closure mechanism. The main cartridge body portion has an aperture via which to insert or take out the disc and is configured for accommodating the disc only in the regular state of permitting recording and/or reproduction to the disc. The opening/closure mechanism opens or closes the aperture.

A disc cartridge according to the present invention accommodates a disc that is non-symmetrical in cross-section relative to the center of thickness of the disc. The disc cartridge includes a main cartridge body portion and an opening/closure mechanism. The main cartridge body portion has an aperture via which to insert or take out the disc and is configured for accommodating the disc only in the regular state of permitting recording and/or reproduction to the disc. The opening/closure mechanism opens or closes the aperture.

A disc cartridge according to the present invention includes a main cartridge body portion, an opening/closure mechanism and a takeout inhibiting mechanism. The opening/closure mechanism opens or closes the aperture. The opening/closure movement of the opening/closure mechanism is inhibited when the inhibiting mechanism specifics the state of inhibiting recording on the disc. The takeout inhibiting mechanism specifies whether or not recording on the disc is possible and inhibits takeout of the disc from the main cartridge body portion in the recording inhibiting state. The takeout inhibiting mechanism is provided on the main cartridge body portion.

BRIEF DESCRIPTION OF THE DRAWINGS

FIG. 22 is a schematic perspective view showing a mistaken recording inhibiting mechanism for a disc cartridge according to a seventh embodiment of the present invention.

FIG. 23 is a schematic perspective view showing a mistaken recording inhibiting mechanism for a disc cartridge according to an eighth embodiment of the present invention.

DESCRIPTION OF THE PREFERRED EMBODIMENTS

Figure 1:
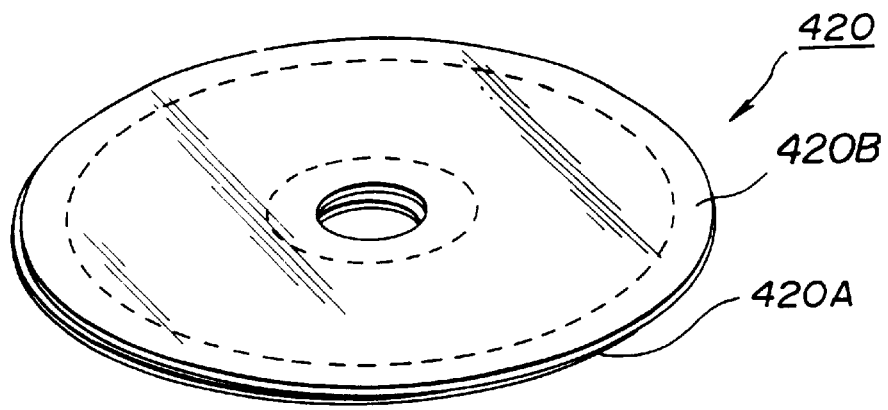
FIG. 1 is a perspective view showing an arrangement of a bonded optical disc.
Figure 2:
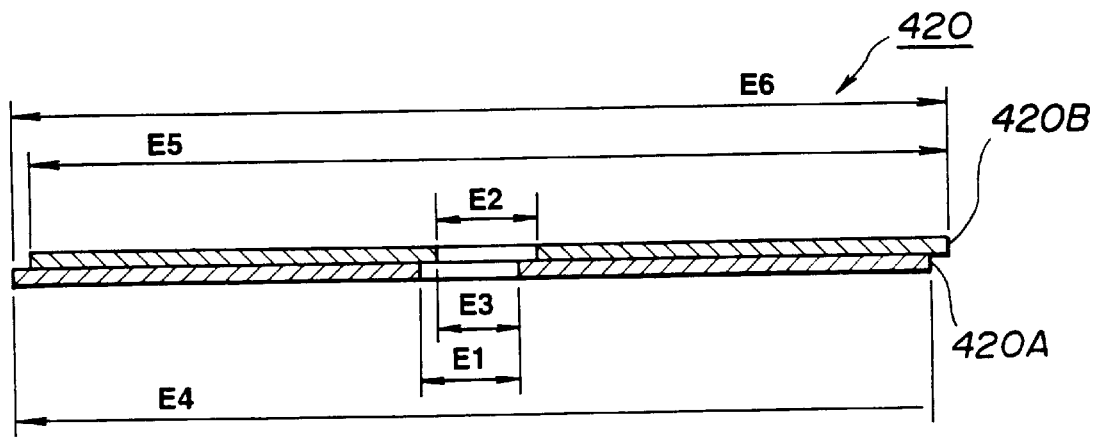
FIG. 2 is a cross-sectional view of an optical disc shown in FIG. 1.
Figure 3:
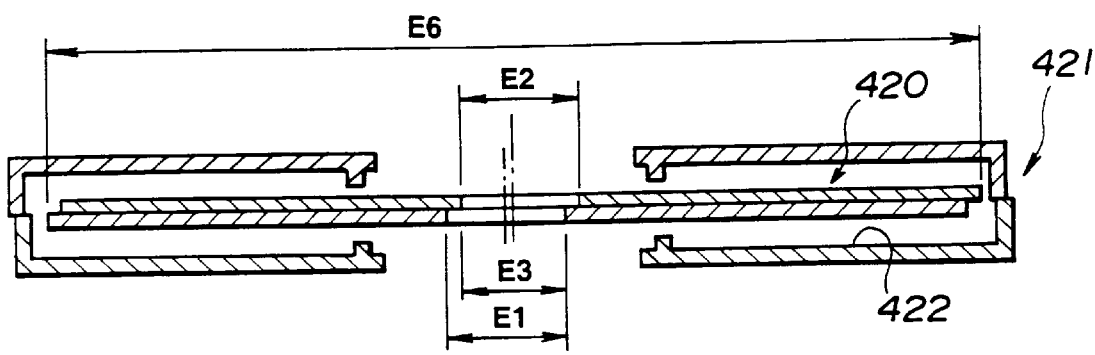
FIG. 3 is a cross-sectional view showing the state in which the optical disc shown in FIG. 1 is housed within a cartridge.

Referring to the drawings, an optical disc and a disc cartridge according to the present invention will be explained in detail.

First, an optical disc according to the present invention is explained.

Figure 4:
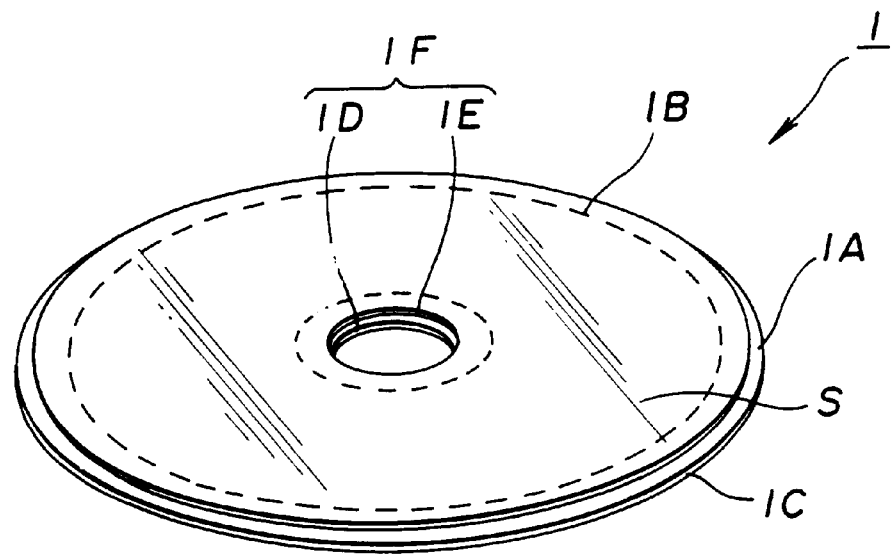
FIG. 4 is a perspective view showing an arrangement of an optical disc according to a first embodiment of the present invention.
Figure 5:
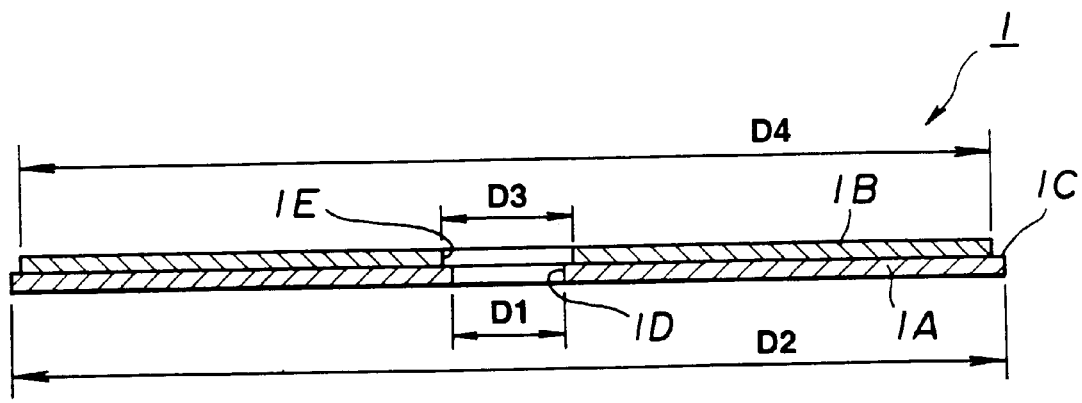
FIG. 5 is a cross-sectional view of the optical disc shown in FIG. 4.

An optical disc 1 according to a first embodiment of the present invention is comprised of a first disc substrate 1A and a second disc substrate 1B bonded to the first disc substrate 1A, as shown in FIGS. 4 and 5.

The first disc substrate 1A is formed as a disc having a center aperture 1D of a light-transmitting synthetic resin or the like material. This first disc substrate 1A has an annular signal recording area S which is covered by a reflective layer as a recording layer formed of, for example, aluminum, and a protective layer of a synthetic resin, such as a UV curable resin. The protective layer is formed for covering the upper surface of the reflective layer for overlying one of the major surfaces in its entirety. If the optical disc 1 is a read-only optical disc, the reflective layer is formed of, for example, aluminum. However, if the optical disc is a recordable disc, it is formed of an optical recording material.

The second disc substrate 1B is formed as a disc having a center aperture 1E of a synthetic resin, such as polycarbonate resin. By being bonded to the first disc substrate 1A, the second disc substrate 1B operates as a supporting plate for maintaining mechanical strength of the first disc substrate 1A. Similarly to the first disc substrate 1A, the second disc substrate 1B may be provided with a reflective layer and a protective layer. In this case, the second disc substrate 1B is bonded to the first disc substrate 1A so that the respective reflective or protective layers face each other.

The second disc substrate 1B is formed so that its center aperture will have an inner dimension D3 larger than the inner dimension D1 of the center aperture 1D of the disc substrate 1A and an outer dimension D4 smaller than the outer dimension D2 of the disc substrate 1A. The optical disc 1 is formed on its outer periphery with a step 1C, as shown in FIG. 4.

The second disc substrate 1B is designed so that the value by which the inner dimension of the center aperture 1E thereof is larger than that of the first disc substrate 1A or the value by which the outer diameter of the second optical disc is smaller than that of the first optical disc 1A will be equal to or larger than any position deviation produced on bonding.

In the above-described optical disc 1, the state in which the first disc substrate 1A and the second disc substrate 1B are bonded together is explained. First, a reference shaft of a centering jig is inserted through center apertures 1D, 1E of the first disc substrate 1A and the second disc substrate 1B, respectively, for positioning. After positioning relative to each other, the first disc substrate 1A and the second disc substrate 1B are bonded together using a UV curable adhesive. The UV curable adhesive is pre-coated on at least one of the major surfaces of the first or second disc substrate. After relative positioning, mentioned above, the UV rays are irradiated from the second disc substrate side for solidifying the UV curable adhesive.

With the above-described optical disc 1 according to the first embodiment, since the inner dimension D1 of the center aperture of the first disc substrate 1A is smaller than the inner dimension of the center aperture of the second disc substrate 1B, while the outer dimension D2 of the first disc substrate 1A is larger than the outer dimension of the first disc substrate 1A, it becomes possible to prevent the position deviation from being produced during bonding. A center aperture 1F of the optical disc 1, thus formed, must be the center aperture 1D of the disc substrate 1A.

With the present optical disc 1, the inner dimension D1 of the center aperture 1D may be positively prevented from becoming smaller than the inner dimensions D1 or D3 of the center aperture 1E of the second disc substrate 1B, while the outer dimension D2 of the center aperture 1D may be positively prevented from becoming larger than the outer dimension D2, D4 of the second disc substrate 1B.

With the present optical disc 1, it becomes possible to provide a necessary clearance between the outer rim of the disc and the inner wall section of the disc housing section of the disc cartridge as later explained.

Figure 6:
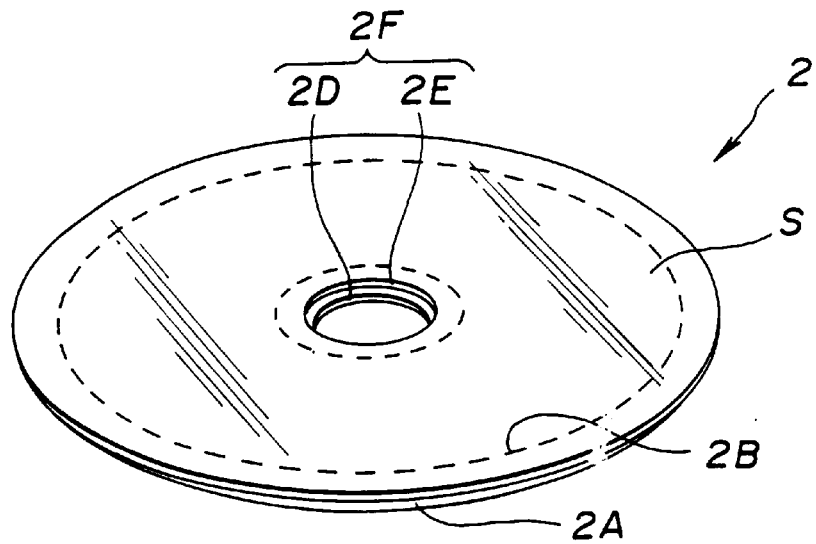
FIG. 6 is a perspective view showing an arrangement of an optical disc according to a second embodiment of the present invention.
Figure 7:
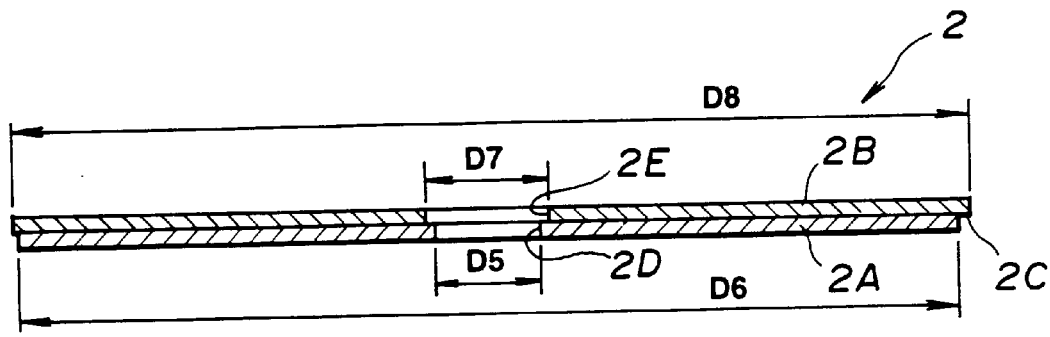
FIG. 7 is a cross-sectional view of an optical disc shown in FIG. 6.
Figure 8:
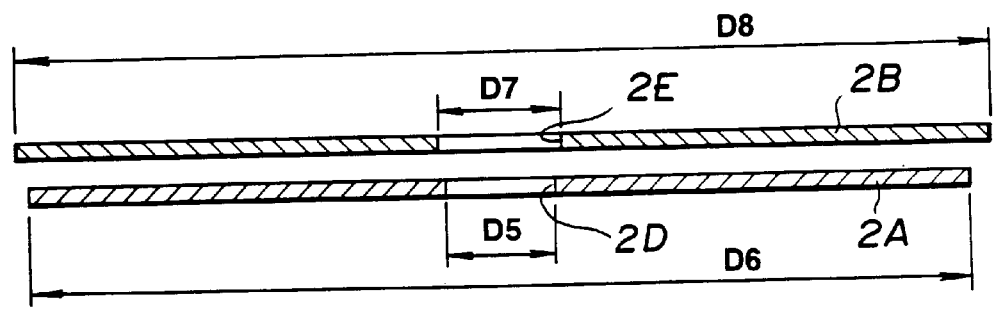
FIG. 8 illustrates the state in which two disc substrates of the optical disc of the second embodiment are bonded together.

An optical disc 2 according to a second embodiment of the present invention is comprised of a first disc substrate 2A and a second disc substrate 2B bonded to the first disc substrate 2A, as shown in FIGS. 6 and 7.

The first disc substrate 2A is formed as a disc having a center aperture 2D of a light-transmitting synthetic resin, such as polycarbonate resin. This first disc substrate 2A has an annular signal recording area S which is covered by a reflective layer as a recording layer formed of, for example, aluminum, and a protective layer of a synthetic resin, such as a UV curable resin. The protective layer is formed for covering the upper surface of the reflective layer for overlying one of the major surfaces of the first disc substrate 2A in its entirety. If the optical disc 2 is a recordable optical disc, a recording layer formed of an optical recording material is provided in place of the Al reflective layer.

The second disc substrate 2B is formed as a disc having a center aperture of a synthetic resin, such as polycarbonate resin. By being bonded to the first disc substrate 2A, the second disc substrate 2B operates as a supporting plate for maintaining mechanical strength of the first disc substrate 2A. The second disc substrate 2B may be provided with a reflective layer and a protective layer, as in the first embodiment described above. In this case, the second disc substrate 2B is bonded to the first disc substrate 2A so that the respective reflective or protective layers face each other.

The second disc substrate 2B is formed so that its center aperture will have an inner dimension D7 larger than the inner dimension D5 of the center aperture 2D of the disc substrate 2A and an outer dimension D8 larger than the outer dimension D6 of the disc substrate 2A. The optical disc 2 is formed on its outer periphery with a step 2C, as shown in FIG. 7.

In the above-described optical disc 2, the state in which the first disc substrate 2A and the second disc substrate 2B are bonded together is explained. First, a reference shaft of a centering jig, not shown, is inserted through a center apertures 2D of the first disc substrate 2A for positioning the outer dimension of the second disc substrate 2B with the center aperture 2D of the first disc substrate 2A as reference. After relative positioning, the first disc substrate 2A and the second disc substrate 2B are bonded together using a UV curable adhesive.

With the above-described optical disc 2 according to the second embodiment, since the inner dimension D7 of the center aperture 2E of the second disc substrate 2B is larger than the inner dimension D5 of the center aperture 2D of the first disc substrate 2A, while the outer dimension D8 of the second disc substrate 2A is larger than the outer dimension D6 of the first disc substrate 2A, it becomes possible to maintain an offset of the outer dimension relative to the inner dimension of the second disc substrate 2B so as to be equivalent to or better than the offset of the outer dimension relative to the inner dimension of the center aperture 2F of the first disc substrate 2A. The result is that the center aperture 2F of the optical disc 2 must be the center aperture 2D of the first disc substrate 2A.

Thus, with the first disc substrate 2A, it is unnecessary to maintain offset of the inner dimension of the center aperture to the outer dimension with high accuracy, while it is unnecessary with the second disc substrate 2B to maintain offset of the outer dimension to the inner dimension of the center aperture. The result is that, with the optical disc 2, the first disc substrate 2A and the second disc substrate 2B can be manufactured with relative ease, thus reducing the production cost.

With the present optical disc 2, it becomes possible to provide a necessary clearance between the outer rim of the disc and the inner wall section of the disc housing section of the disc cartridge as later explained, thus enabling a disc cartridge to be produced at a reduced cost.

In addition, with the present optical disc 2, the offset between the center aperture 2D of the first disc substrate 2A having the signal recording area S and the outer rim of the optical disc 2 can be maintained with high accuracy, so that it becomes possible to set the clearance necessary between the inner wall section of the disc housing section of the disc cartridge as later explained and the outer rim of the disc 2 to a small value. Thus it is unnecessary with the present optical disc 2 to maintain high precision on the side of the recording/reproducing apparatus to reduce the production cost of the recording and/or reproducing apparatus.

Next, a disc cartridge according to the present invention, housing therein an optical disc according to the above-described first embodiment, is explained.

Figure 9:
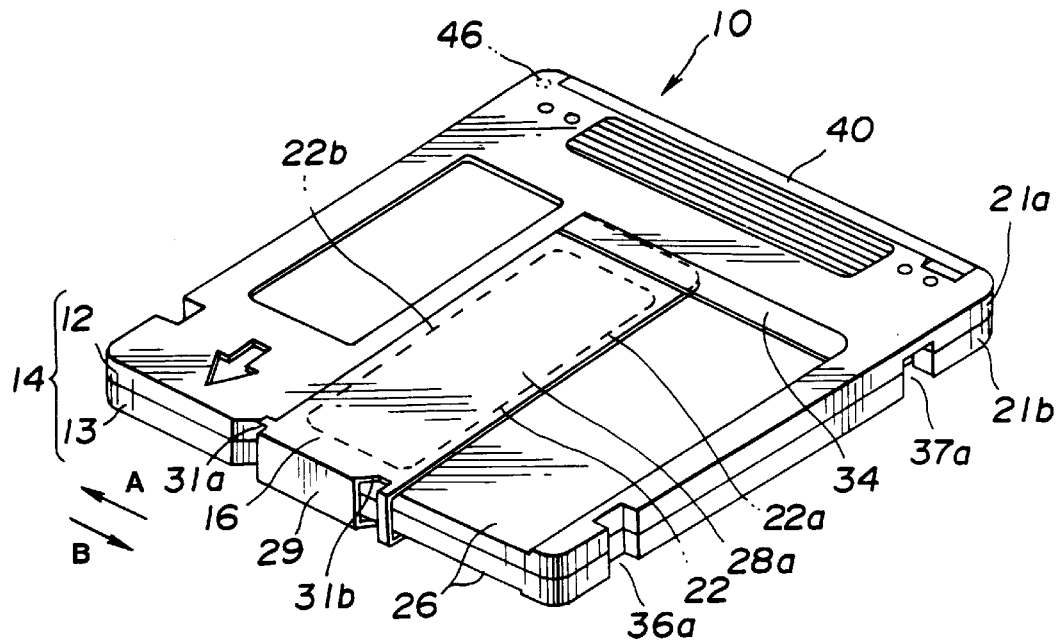
FIG. 9 is a perspective view showing an arrangement of a disc cartridge housing the first embodiment of the optical disc therein.
Figure 10:
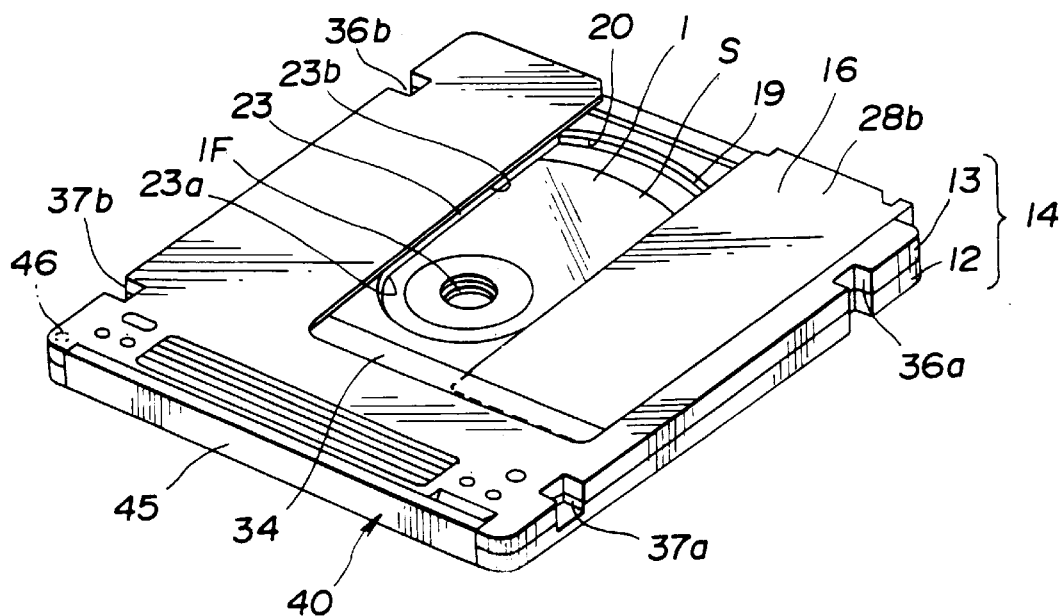
FIG. 10 is a perspective view showing the state in which the disc cartridge shown in FIG. 9 is seen from its reverse side.

Referring to FIGS. 9 and 10, a disc cartridge 10 has a main cartridge body portion 14 which is made up of an upper cartridge half 12 and a lower cartridge half 13 each of which is shaped as a saucer of shallow depth. The optical disc 1 is rotatably accommodated within the main cartridge body portion 14. A shutter 16 is slidably mounted on the front side of the main cartridge body portion 14. In the back side of the main cartridge body portion 14 is formed a disc insertion/takeout aperture, not shown in FIGS. 9 and 10, via which the disc 1 can be inserted or taken out. The optical disc 1 herein is an optical disc capable of recording information signals.

The upper cartridge half 12 and the lower cartridge half 13 are each formed of a synthetic resin material of good moldability and sufficient mechanical strength, such as ABS resin, substantially in the shape of a saucer of shallow depth, as shown in FIGS. 9 and 10. The upper and lower cartridge halves 12, 13 are formed with upstanding peripheral wall sections 21a, 21b, respectively. These wall sections are formed on the peripheral portions of the cartridge halves except the rear lateral sides. When the upper and lower cartridge halves 12, 13 are combined together, the upstanding peripheral wall sections 21a, 21b are abutted against each other and secured together by plural set screws for making up the outer peripheral wall section of the main cartridge body portion 14.

On each of the facing inner surfaces of the upper and lower cartridge halves 12, 13 are formed plural interrupted arcuate wall sections lying on the same circumference of a circle for inscribing the peripheral wall sections 21a, 21b. These arcuate wall sections together make up a disc housing wall section 19. The disc housing wall section 19 of the upper cartridge half 12 is slightly larger than the outer diameter of the disc substrate 1B and larger in height than the thickness of the disc substrate 1B. The disc housing wall section 19 of the lower cartridge half 13 is slightly larger than the outer diameter of the disc substrate 1A and larger in height than the thickness of the disc substrate 1A. When the upper and lower cartridge halves 12, 13 are combined together, the disc housing wall sections 19 make up the disc housing section 20 along with the inner surfaces of the cartridge halves 12, 13. This disc housing section 20 delimits a spacing slightly larger than the outer shape of the optical disc 1 and substantially convex-shaped in cross-section. The disc housing section 20 restricts movement of the optical disc 1 housed in the inside of the cartridge main body portion 14.

In the cartridge halves 12, 13 are formed apertures 22, 23, respectively, extending from the center portions towards one lateral sides of the cartridge halves 12, 13. Into mid portions 22a, 23a of the apertures 22, 23 is intruded a disc table of the recording and/or reproducing apparatus when the disc cartridge 10 is loaded thereon. The disc table is configured for rotationally driving the optical disc 1 housed within the disc housing section 20.

In continuation to the mid portions 22a, 23a of the apertures 22, 23 are extended portions 22b, 23b located towards one lateral sides of the cartridge halves 12, 13. These portions 22b, 23b permit at least part of the recording area 14 of the optical disc 1 to be exposed to the outside across the inner and outer rims of the disc. These portions 22b, 23b are used as recording and/or reproducing apertures 23. That is, when the disc cartridge 1 is loaded on the recording and/or reproducing apparatus, a recording/reproducing unit, such as an optical head, faces the optical disc 1 via these portions 22b, 23b of the apertures 22, 23.

In the outer surface of the main cartridge body portion 14 is formed a recess 26. The recess 26 is formed in register with the movement range of the shutter 16 which is moved between a position of closing the apertures 22, 23 and a position of opening the apertures 22, 23 by a shutter opening/closure mechanism provided on the recording and/or reproducing apparatus when the disc cartridge 10 is loaded thereon.

When the disc cartridge 10 is not in use, that is, when the disc cartridge 10 is not loaded on the recording and/or reproducing apparatus, the shutter 16 prevents dust and dirt from entering the disc housing unit 20 via the apertures 22, 23 so as to be deposited on the optical disc 1 housed within the disc housing unit 20. When in the state of closing the apertures 22, 23, the shutter 16 prevents the hand or finger from touching the recording area S of the disc 1. The shutter 16 is produced by press-working a thin metallic plate and is comprised of a pair of major surface sections 28a, 28b dimensioned to close the apertures 22, 23 of the upper and lower cartridge halves 12, 13 and a connecting portion 29 interconnecting these major surface sections 28a, 28b. The shutter 16 is formed so as to have a U-shaped cross-section.

The shutter 16 is secured by plural set screws to a shutter guide member, not shown. In both lateral sides of the connection portion 29 of the shutter 16 are formed cut-outs 31a, 31b into which are intruded shutter opening pins of a shutter opening/closing mechanism, not shown of the recording and/or reproducing apparatus.

The above-described shutter 16 is mounted in the recess 26 of the main cartridge body portion 14 for clamping the main cartridge body portion 14. The distal ends of the major surface sections 28 are pressed by a shutter retainer member 34, while a shutter guide member, not shown, is fitted in a mating guide groove formed in the main cartridge body portion 4. The disc cartridge 10 is retained by an end of a spring, not shown, the other end of which is retained by the main cartridge body portion 4. The shutter 16 is perpetually biased by this spring in a direction indicated by arrow A in FIG. 9. When the shutter 16 is loaded on the recording and/or reproducing apparatus, the shutter opening pin of the shutter opening mechanism is engaged with one of the cut-outs 31a or 31b. This causes the shutter to be slid in a direction indicated by arrow B in FIG. 9 from a position closing the apertures 22, 23 to a position opening the apertures 22, 23.

Although the above description has been made of the shutter member 16 being moved in one direction, the shutter member 16 may, of course, be constructed so as to be moved in the left-and-right direction. In this case, the recess 16 in the main cartridge body portion 14 needs to be formed in the entire area on the forward side of each of the upper cartridge half 12 and the lower cartridge half 13.

Towards the front side on both lateral side edges of the main cartridge body portion 14 are formed insertion control recesses 36a, 36b. These insertion control recesses 36a, 36b are engaged by insertion control pins on an automatic loading device when the disc cartridge 10 is automatically loaded by the automatic loading device on the recording and/or reproducing apparatus. The insertion control recesses 36a, 36b are engaged by insertion control pins on the automatic loading device when the disc cartridge 10 is moved by the automatic loading device as far as a pre-set position in the recording and/or reproducing apparatus.

The insertion control recesses 36a, 36b are formed for extending from the upper cartridge half 12 through to the lower cartridge half 13. Since the insertion control recesses 36a, 36b are formed through the entire thickness of the disc cartridge, it can be discerned, when the plural disc cartridges 10 are housed in the stacked state in the disc cartridge housing device, whether the disc cartridges 10 are housed in the regular orientation. If the disc cartridges 10 are not housed in the regular orientation, the insertion control recesses 36a, 36b are not aligned with one another, thus allowing the user to discern which of the disc cartridges has been housed in the incorrect orientation.

Towards the rear side on both lateral side edges of the main cartridge body portion 14 are formed takeout control cut-outs 37a, 37b. When the disc cartridge 10 is taken out automatically from the recording and/or reproducing apparatus, these takeout control cut-outs 37a, 37b are engaged by takeout pins, not shown, provided on the automatic loading device. When the disc cartridge 10 is moved from the pre-set position in recording and/or reproducing apparatus by the automatic loading device, the takeout control cut-outs 37a, 37b are engaged by the takeout pins provided on the automatic loading device.

These takeout control cut-outs 37a, 37b are not formed from the upper cartridge half 12 through to the lower cartridge half 13, but are formed from the lower cartridge half 13 as far as a mid height level of the upstanding peripheral wall section 21 of the upper cartridge half 12. Thus, when the disc cartridge 10 is taken manually out of the disc recording and/or reproducing apparatus, that is, without using the automatic loading device, these takeout control cut-outs 37a, 37b are not caught by the peripheral wall portion of the disc cartridge insertion opening of the disc recording and/or reproducing apparatus, thus enabling smooth insertion or ejection.

Figure 11:
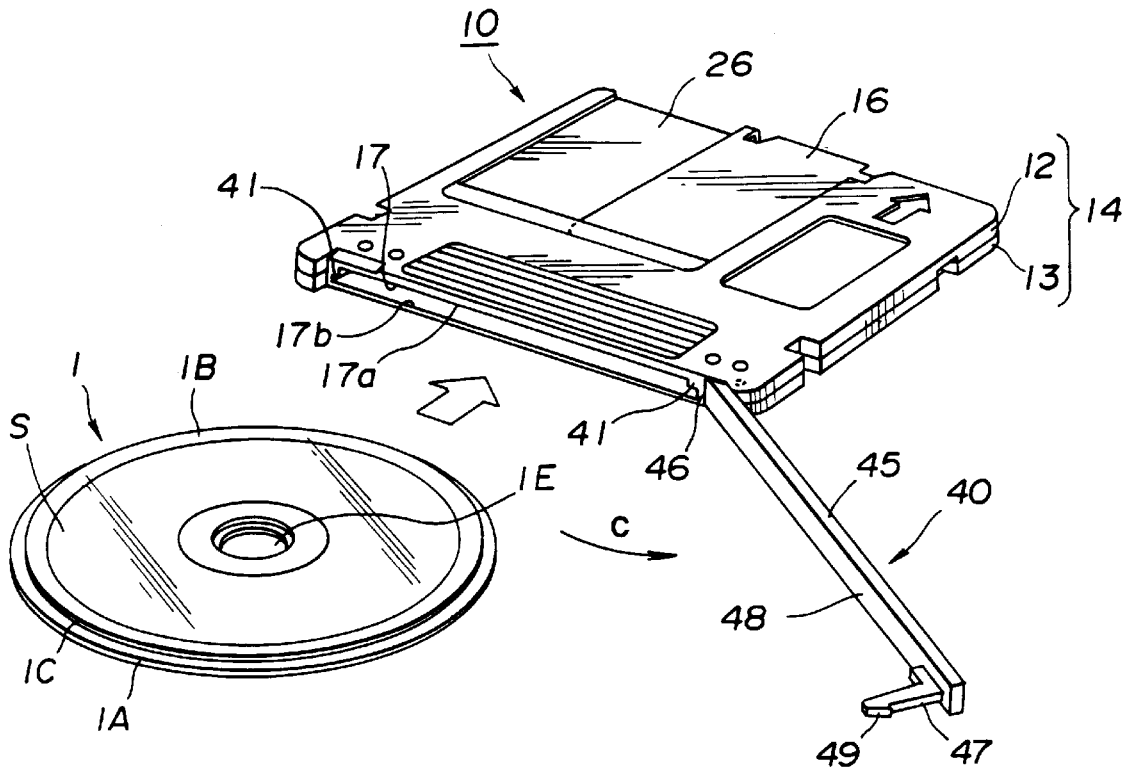
FIG. 11 is a perspective view showing the state in which an optical disc is inserted into the disc cartridge shown in FIG. 9.
Figure 12:
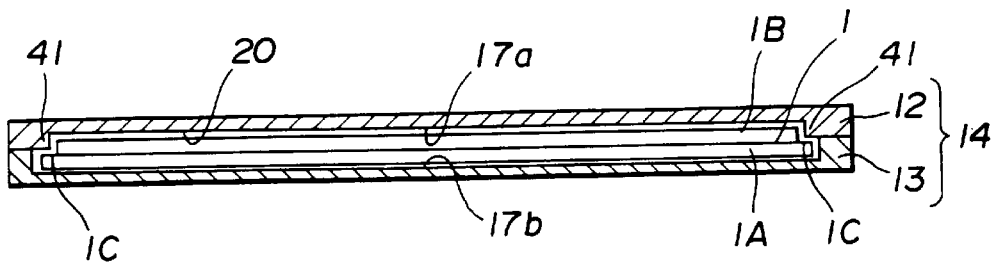
FIG. 12 is across-sectional view showing the state in which the optical disc shown in FIG. 9 is housed within a cartridge.

In the main cartridge body portion 14, there is formed, on the side thereof opposite to the side carrying the shutter 16, a disc insertion/ejection aperture 17, as shown for example in FIG. 11. When the disc cartridge is, not in use, that is when the disc cartridge is not loaded on the disc recording and/or reproducing apparatus, the disc insertion/ejection aperture 17 is closed by a lid 40 mounted on a hinge on the rear side of the main cartridge body portion 14 for opening/closure with respect to the main cartridge body portion 14.

On both lateral sides of the disc insertion/ejection aperture 17 of the upper cartridge half 12 are formed rib-like retainers 41. By the provision of the retainers 41, the disc insertion/ejection aperture 17 is formed so as to be larger in size than the cross-sectional area of the optical disc 1 as a whole and is opened in the shape of a rectangle stepped at each upper edge. The disc insertion/ejection aperture 17 is made up of a first opening 17a delimited by the retainers 41 in register with a step 1C of the optical disc 1 and having the size of the long side slightly larger than the diameter of the disc substrate 1B with a smaller diameter and the size of the short side slightly larger than the thickness of the disc substrate 1B, and a second opening 17b having the size of the long side slightly larger than the diameter of the disc substrate 1A with a larger diameter and the size of the short side slightly larger than the thickness of the disc substrate 1A.

The disc insertion/ejection aperture 17, constructed as described above, is kept in communication with the inside and the outside of the main cartridge body portion 14 and with the disc housing section 20 in the main cartridge body portion 14. This prevents the optical disc 1 from being inserted in a mistaken manner into the disc housing section 20 via the disc insertion/ejection aperture 17. When inserting the optical disc 1 into the disc housing section 20, such insertion of the optical disc 1 is enabled only when the optical disc is inserted via the disc insertion/ejection aperture 17 with the substrate 1B of the optical disc 1 in alignment with the first aperture 17a and with the substrate 1A of the optical disc 1 in alignment with the second aperture 17b. Conversely, should the optical disc 1 be inserted into the disc insertion/ejection aperture 17 with the substrate 1A of the optical disc 1 in alignment with the first aperture 17a and with the substrate 1B of the optical disc 1 in alignment with the second aperture 17b, the step 1C of the optical disc 1 is abutted against the retainers 41 thus inhibiting insertion of the optical disc 1 into the inside of the disc housing section 20.

The lid 40, adapted for closing the disc insertion/ejection aperture 17, has a main portion 45 for closing the disc insertion/ejection aperture 17, a hinge portion 46 formed at an end of the main portion 45, and a retention piece 47 formed at the opposite end of the main portion 45.

The main portion 45 has a closure surface 48 facing the disc insertion/ejection aperture 17. The closure surface 48 has a thickness substantially equal to the height of the disc insertion/ejection aperture 17 of the main cartridge body portion 14 and a length at least substantially equal to the length of the disc insertion/ejection aperture 17 and is dimensioned to be large enough to close the disc insertion/ejection aperture 17. Thus, when in the state of closing the disc insertion/ejection aperture 17, the main portion 45 is flush with the major surface and lateral side of the main cartridge body portion 14.

The hinge portion 46 supports the main portion 45 for opening/closure with respect to the main cartridge body portion 14 by having a fitting portion, not shown, on the main portion 45, fitted on a supporting pin, not shown, formed on one end of the disc insertion/ejection aperture 17 of the main cartridge body portion 14. On the opposite end of the main portion 45 is formed a retention piece 47 as one with the main portion 45. The distal end of the retention piece 47 is formed as a retainer 49.

When in the state of closing the disc insertion/ejection aperture 17, the lid 40 is engaged with a protrusion, not shown, formed on the opposite end of the disc insertion/ejection aperture 17 of the main cartridge body portion 14, so that it is not opened even if subjected to vibrations during transport of the disc cartridge 10. When opening the disc insertion/ejection aperture 17, the lid 40 is disengaged from the protrusion, not shown, of the retention piece 47, so as to be opened in a direction shown by arrow C in FIG. 11.

Figure 13:
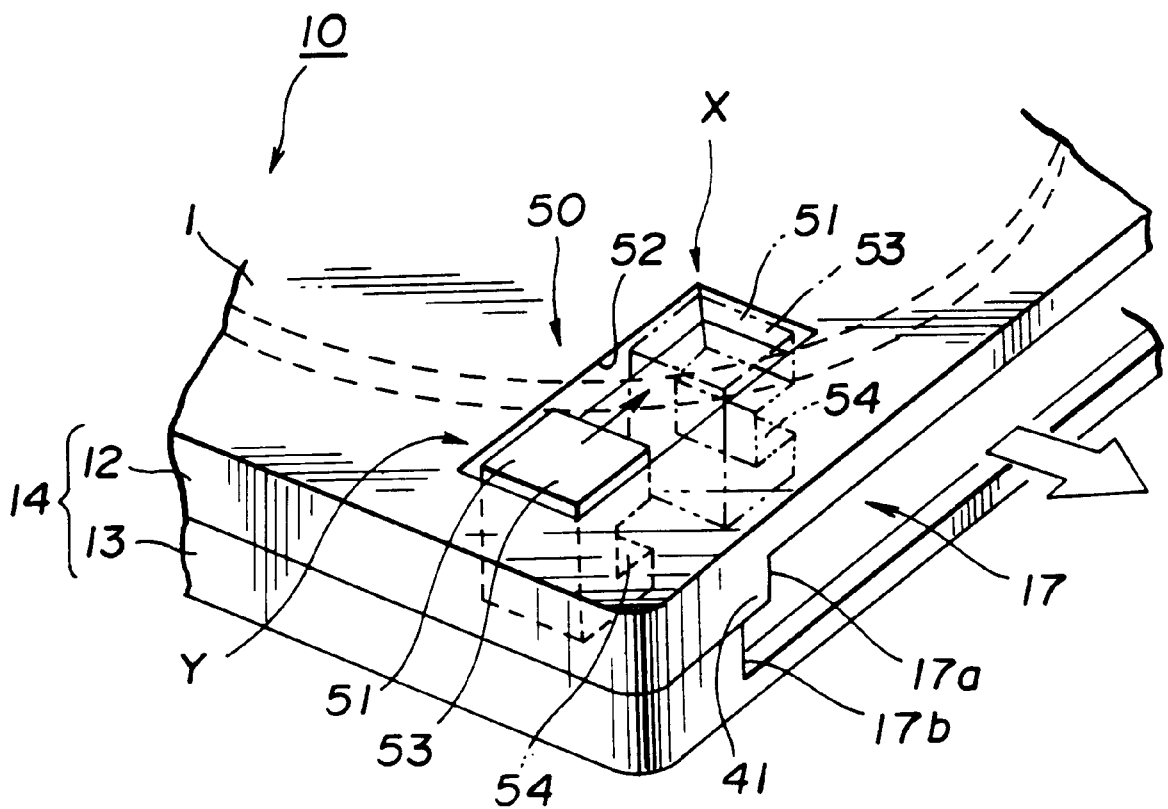
FIG. 13 is a schematic perspective view showing a mistaken recording inhibiting mechanism of the disc cartridge shown in FIG. 9.

The main cartridge body portion 14, as shown in FIG. 13, is provided with a mistaken recording inhibiting mechanism 50 configured for preventing inadvertent erasure of information signals recorded on the optical disc 1. This mistaken recording inhibiting mechanism 50 is made up of a mistaken recording inhibiting member 51, arranged in the vicinity of a corner of the main cartridge body portion 14 towards the disc insertion/ejection aperture 17, and a control opening 52 formed in the main cartridge body portion 14 for exposing the inhibiting member 51 to the outside.

The mistaken recording inhibiting member 51 is made up of an operating portion 53 exposed to the outside of the control opening 52 and a retention portion 54 for retaining the optical disc 1, and is formed in its entirety of a synthetic resin material in a U-shaped cross-section. The control opening 52 is formed in the vicinity of the corner of the upper and lower cartridge halves 12, 13 towards the disc insertion/ejection aperture 17.

When the mistaken recording inhibiting mechanism 50 is in the first position, that is, in a position indicated X in FIG. 13, the retention portion 54 of the mistaken recording inhibiting member 51 retains the lateral edge of the disc 1, while allowing for intrusion of a detection portion of mistaken recording detection means, not shown, provided on the recording and/or reproducing apparatus, thus inhibiting writing of new information signals. When in the first position, that is, in the position X shown in FIG. 13, the mistaken recording inhibiting member 51 inhibits extraction of the disc 1 from the disc insertion/takeout aperture 17, while simultaneously inhibiting writing of new information signals on the disc 1.

When the mistaken recording inhibiting member 51 is slid to a second position, that is, a position indicated Y in FIG. 13, the mistaken recording inhibiting mechanism 50 is released from the state in which the retention portion 54 retains the lateral edge of the disc 1. This enables the optical disc 1 to be taken out of the disc insertion/takeout aperture 17, while inhibiting intrusion of the mistaken recording detection means, not shown, provided on the recording and/or reproducing apparatus, thus permitting recording of new information signals. When in the second position, that is, in the position shown at Y in FIG. 13, the mistaken recording inhibiting member 51 enables the optical disc 1 to be taken out of the disc insertion/takeout aperture 17, while permitting recording of new information signals.

If the above-described disc cartridge 10, having the optical disc 1 housed therein, is loaded on the recording and/or reproducing apparatus, the disc cartridge 10 is positioned by a positioning mechanism, not shown, while the shutter 16 is slid in a direction indicated by arrow B in FIG. 9 for exposing the apertures 22, 23 to the outside. The optical disc 1 housed in the disc cartridge 10 is clamped by the disc table on the recording and/or reproducing apparatus and by the chuck member and thereby enabled for rotation.

With the above-described disc cartridge 10, when the disc 1 is taken out of the optical disc cartridge 10, the mistaken recording inhibiting member 51 of the mistaken recording inhibiting mechanism 50 is brought simultaneously to the second position, that is to the position Y shown in FIG. 13. Thus the user may be apprized of the fact that the writing on the exposed optical disc 1 is enabled. If the optical disc 1 is loaded on the recording and/or reproducing apparatus in the state in which it is not accommodated within the disc cartridge 10, new information signals can be written on the optical disc 1.

Also, with the disc cartridge 10, if the optical disc 1 is accommodated in the disc cartridge 10, and the mistaken recording inhibiting member 51 of the mistaken recording inhibiting mechanism 50 is, in the first position, that is in the position X shown in FIG. 13, the user may be apprized of the fact that writing on the optical disc 1 is disabled.

If the above-described disc cartridge 10 is loaded on the recording and/or reproducing apparatus in the state in which the optical disc 1 is accommodated therein, the disc cartridge 10 is positioned, at the same time as the shutter 16 is moved in a direction indicated by arrow B in FIG. 9, thus exposing the apertures 22, 23 to the outside.

The disc table on the recording and/or reproducing apparatus is intruded into the inside of the recording and/or reproducing apparatus via one of the mid portions 22a, 23a of the apertures 22, 23. The optical disc 1 accommodated within the disc cartridge 10 is clamped by the chuck member and the disc table provided on the recording and/or reproducing apparatus and thereby enabled for rotation.

The optical disc housed within the disc cartridge 10 can be exchanged with a new one when the disc cartridge is not in use. In this case, with the lid 40 of the disc cartridge 10 opened and with the disc insertion/takeout aperture 17 facing to the outside, the disc cartridge is tilted, with the aperture 17 facing downwards. The optical disc 1 can be slid and taken outwards. For accommodating the optical disc 1 in the main cartridge body portion 14, the side of the optical disc 1 towards the disc substrate 1B is set towards the first aperture 17a, while the side of the disc 1 towards the disc substrate 1A is set towards the second aperture 17b, with the lid 40 in the closed state. The optical disc 1 is inserted in this state via the disc insertion/takeout aperture 17. Since the disc insertion/ejection aperture 17 is formed so as to be larger in size than the cross-sectional area of the optical disc 1 as a whole and is opened in the shape of a rectangle stepped at each upper edge, in register with the step 1C of the optical disc 1, there is no risk of the optical disc 1 being inserted upside-down.

Therefore, with the present disc cartridge 10, there is no risk of the user inadvertently inserting the optical disc 1 into the main cartridge body portion 14, with the recording and/or reproducing side not desired to be recorded or reproduced set in the recording and/or reproducing position, while there is also no risk of inadvertent erasure of the desired information signals recorded on the optical disc 1.

In the above-described disc cartridge 10, it is assumed that the disc housing section 20 formed in the main cartridge body portion 14 is in the shape of a rectangle stepped at each upper edge, similar to the shape of the disc insertion/takeout aperture 17. It should however be noted that the disc housing wall sections of the upper and lower cartridge halves 12, 13 can be slightly larger than the outside diameter of the disc substrate 1A for delimiting a disc housing section with a rectangular cross-section.

Figure 14:
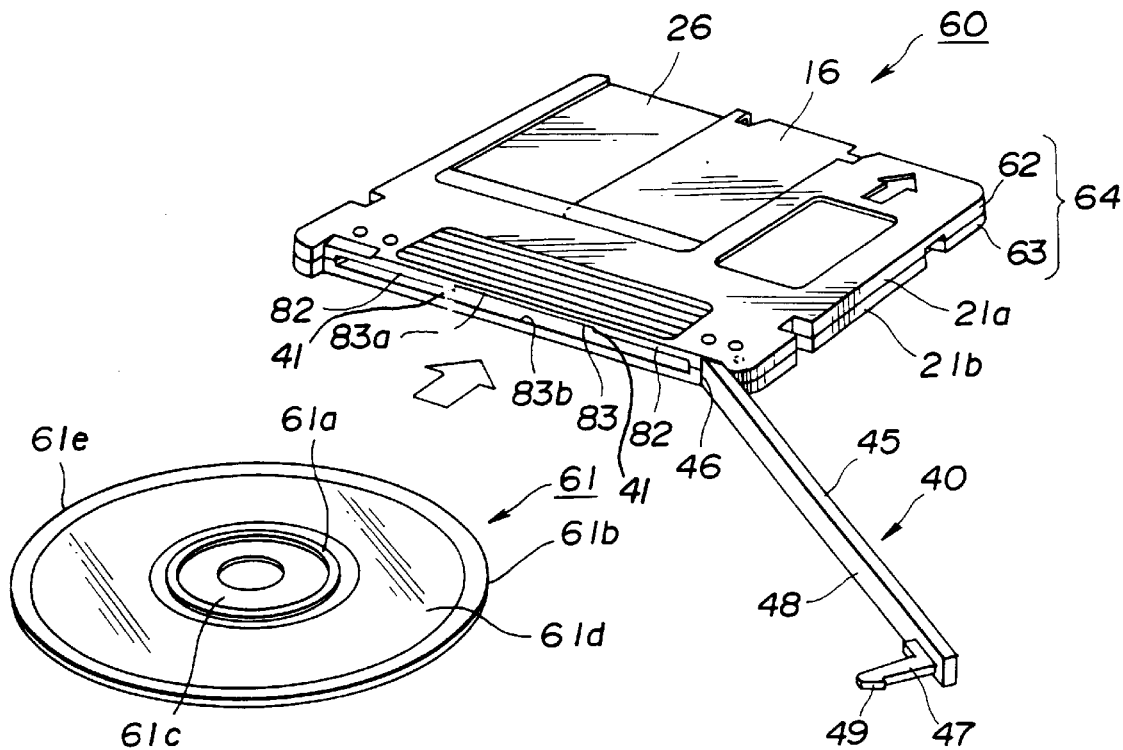
FIG. 14 is a perspective view showing an optical disc and a disc cartridge according to a third embodiment of the present invention.
Figure 15:
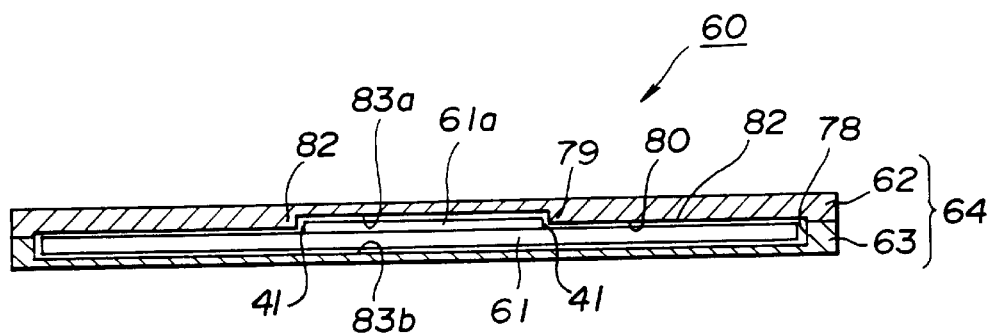
FIG. 15 is a cross-sectional view showing the state in which an optical disc has been housed in the disc cartridge according to the third embodiment of the present invention.

An optical disc and a disc cartridge according to a third embodiment are now explained. By referring to FIGS. 14 and 15, a disc cartridge 60 is first explained. The disc cartridge 60 has a toroidal rib 61a on the inner peripheral portion of an optical disc 61 where no information signals are recorded. A main cartridge body portion 63 has a disc insertion/takeout aperture 83 of substantially the same shape as the cross-sectional shape of the optical disc 61. The portions or components similar to those used in common with those of the disc cartridge 10 shown in FIGS. 9 to 11 are denoted by the same reference numerals and the description therefor is not made.

Similarly to the disc cartridge 10, shown in FIGS. 9 to 11, the disc cartridge 60 has a main cartridge body portion 64 formed by combining an upper cartridge half 62 and a lower cartridge half 63 each of which is substantially in the shape of a saucer of shallow depth. The optical disc 61, such as a write-once optical disc or a magneto-optical disc, is rotatably accommodated within the main cartridge body portion 64. The shutter 16 is slidably mounted on the front side of the main cartridge body portion 64. The back side of the main cartridge body portion 64 is formed with a disc insertion/takeout aperture 83 for use to insert or take out the optical disc 61. The upper and lower cartridge halves 62, 63 are configured similarly to the cartridge halves 12, 13 of the disc cartridge 10 shown in FIGS. 9 to 11.

The optical disc 61, accommodated within the disc cartridge 60, is constituted by a sole disc substrate 61b, on one major surface of which an information signal area is formed. This disc substrate 61b has a centrally arranged inner rim holding portion 61c, in which no information signals are recorded, a recording area 61d radially outwardly of the inner rim holding portion 61c, in which to record information signals, and an outer rim side non-recording area 61e radially outwardly of the recording area 61d, in which no information signals are recorded. The optical disc 61 is formed with an upstanding toroidal rib 61a extending along an outer edge of the inner rim holding portion 61c on the signal-recording major surface, that is, the recording and/or reproducing surface. Thus the disc has a cross-section of a rectangle with a central raised quadrangular portion.

The inner surface of the main cartridge body portion 64 is formed with an outer rim side disc housing wall section 78 and an inner rim side disc housing wall section 79. The outer rim side disc housing wall section 78 is made up of plural arcuate wall sections lying on the same circumference of a circle. On the other hand, the inner rim side disc housing wall section 79 is formed on the inner surface of the upper cartridge half 62 which is in register with the outer rim of the upstanding toroidal rib 61a when the optical disc 61 is accommodated in the main cartridge body portion 64. The outer rim side disc housing wall section 78 is slightly larger than the outer diameter of the optical disc 61 and slightly thicker than the thickness of the optical disc 61. The inner rim side disc housing wall section 79 has a height slightly larger than the height of the rib 61a. When the upper and lower cartridge halves 62, 63 are combined together, the disc housing wall sections 78, 79 are abutted to each other for delimiting a disc housing section 80 having the cross-section of a rectangle with a central raised quadrangular portion. The disc housing section 80 limits the amount of movement in the main cartridge body portion 64 of the optical disc 61 housed therein.

The side of the main cartridge body portion 64 opposite to its front side carrying the shutter 16 is formed with a disc insertion/takeout aperture 83. When the disc cartridge 60 is out of use, that is, when the disc cartridge 60 is not loaded on the recording and/or reproducing apparatus, the disc insertion/takeout aperture 83 is closed by the lid 40 mounted for opening/closure on the rear side of the main cartridge body portion 64.

On the portions of the disc insertion/ejection aperture 83 towards the upper cartridge half 62 in register with the inner rim holding portion 61c and the recording area 61d are formed retention portions 41. By the provision of the retention portions 41, the disc insertion/ejection aperture 83 is formed so as to be larger in size than the cross-sectional area of the optical disc 1 as a whole and is shaped as a rectangle raised at a center portion. The disc insertion/ejection aperture 83 is made up of a first opening 83a delimited by the retention portions 41 in register with the inner rim holding portion 61C of the optical disc 1 and having the size of the long side slightly larger than the diameter of the inner rim holding portion 61C and the size of the short side slightly larger than the height of the rib 61a, and a second opening 83b having the size of the long side slightly larger than the diameter of the disc substrate 61b and the size of the short side slightly larger than the thickness of the disc substrate 61b.

The disc insertion/ejection aperture 83, constructed as described above, is kept in communication with the inside of the disc housing section 80 of the main cartridge body portion 64. This prevents the optical disc 61 from being inserted in a mistaken manner into the disc housing section 80 via the disc insertion/ejection aperture 83. When inserting the optical disc 61 into the disc housing section 80 of the disc cartridge 60, such insertion of the optical disc 61 is enabled only when the optical disc is inserted via the disc insertion/ejection aperture 83 with the inner rim holding portion 61C of the optical disc 61 in alignment with the first aperture 83a and with the substrate 61b in alignment with the second aperture 83b. Conversely, should the optical disc 61 be inserted into the disc insertion/ejection aperture in the reversed front-reverse side position with respect to the position for normal insertion, that is with the disc substrate 61b in alignment with the first aperture 83a and with the inner rim holding portion 61c in alignment with the second aperture 83b, insertion of the optical disc 61 is rejected.

The optical disc housed within the disc cartridge 60 can be exchanged with a new one when the disc cartridge is not in use, as in the case of the disc cartridge 60 shown in FIGS. 9 to 11. In this case, with the lid 40 of the disc cartridge 60 opened and with the disc insertion/takeout aperture 83 facing to outside, the disc cartridge is tilted, with the aperture 83 facing downwards. The optical disc 61 can then be slid and taken outwards. For accommodating the optical disc 61 in the main cartridge body portion 64, the inner rim holding portion 61C of the optical disc 61 is set towards the first aperture 83a, while the disc substrate 61b is set towards the second aperture 83b, with the lid 40 in the closed state. The optical disc 1 is inserted in this state via the disc insertion/takeout aperture 83 into the main cartridge body portion 64. Since the disc insertion/ejection aperture 83 is formed so as to be larger in size than the cross-sectional area of the optical disc 1 as a whole and is opened in the shape of a rectangle stepped at each upper edge, in register with the inner rim holding portion 61C of the optical disc 1, there is no risk of the optical disc 1 being inserted upside-down.

Therefore, with the present disc cartridge 60, there is no risk of the user inadvertently inserting the optical disc 61 into the main cartridge body portion 64, with the recording and/or reproducing side not desired to be recorded or reproduced set in the recording and/or reproducing position, while there is also no risk of inadvertent erasure of the desired information signals recorded on the optical disc 1.

In the above-described disc cartridge 60, it is assumed that the disc housing section 80 formed in the main cartridge body portion 64 is in the shape of a rectangle stepped at each upper edge, similar to the shape of the disc insertion/takeout aperture 83. It should however be noted that the disc housing wall sections 78, 79 of the upper and lower cartridge halves 62, 63 may also be slightly larger than the outside diameter of the disc substrate 61b, with the height of the disc housing wall sections 78, 79 being the sum of the thickness of the disc substrate 61b and the height of the rib 61b, for constituting a disc housing section with a rectangular cross-section.

Figure 16:
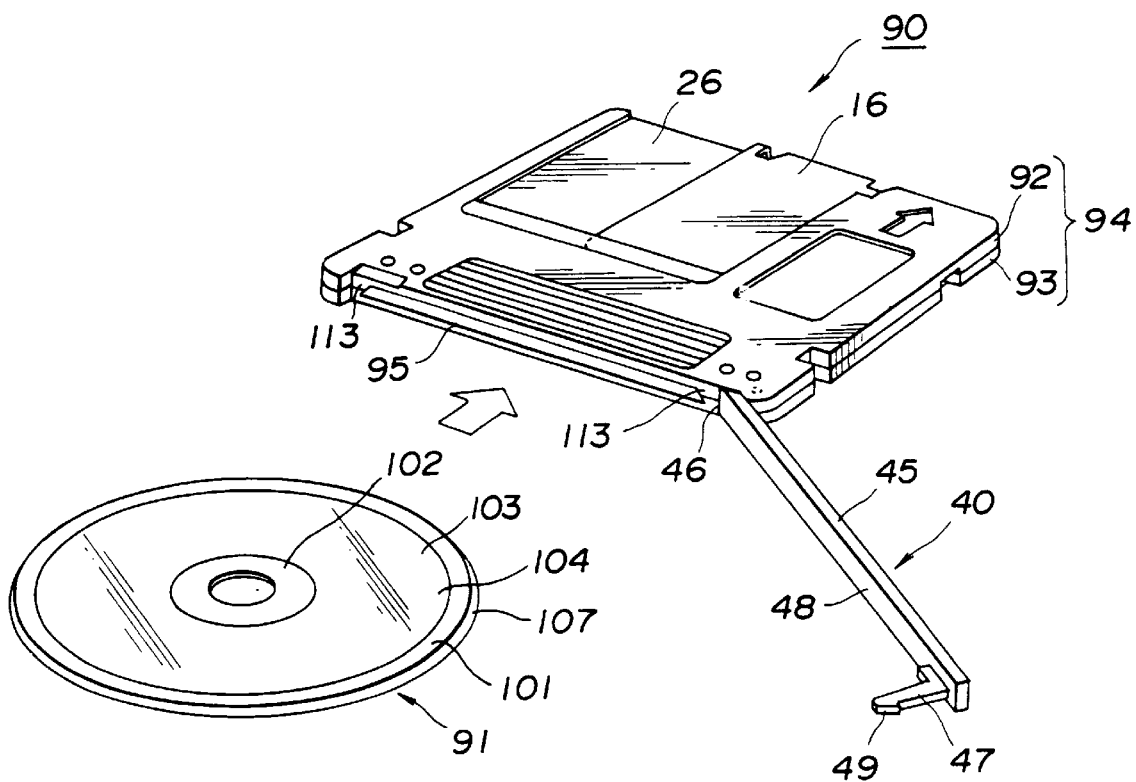
FIG. 16 is a perspective view showing an optical disc and a disc cartridge according to a fourth embodiment of the present invention.
Figure 17:
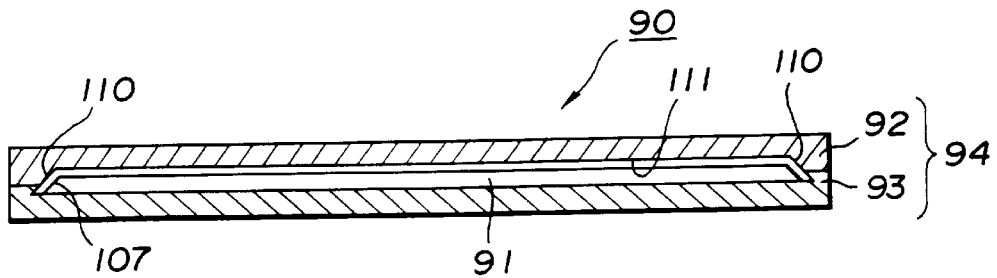
FIG. 17 is a cross-sectional view showing the state in which an optical disc has been housed in the disc cartridge according to the fourth embodiment of the present invention.

An optical disc and a disc cartridge according to a fourth embodiment of the present invention will now be explained. First, a disc cartridge 90 according to the fourth embodiment is explained by referring to FIGS. 16 and 17. For inserting or taking out an optical disc 91 having a beveled outer rim, the present disc cartridge 90 has a main cartridge body portion 92 formed with a disc insertion/takeout aperture 93 of the same cross-sectional shape as that of the optical disc 91. The portions and components used in common with those of the disc cartridge 10 shown in FIGS. 9 and 10 are denoted by the same reference numerals and the corresponding description is omitted for simplicity.

The disc cartridge 90 has a main cartridge body portion 94 made up of an upper cartridge half 92 and a lower cartridge half 93 which, similarly to the upper and lower cartridge halves 12, 13 of the disc cartridge 10 shown in FIGS. 9 to 11, are shaped substantially as saucers of shallow depth. The optical disc 91, such as a write-once optical disc or a magneto-optical disc, is rotatably accommodated within the main cartridge body portion 94. The shutter 16 is slidably mounted on the main cartridge body portion 94. The back side of the main cartridge body portion 94 is formed with a disc insertion/takeout aperture 95 via which to inset or take out the optical disc 91.

The optical disc 91, accommodated within the disc cartridge 90, is constituted by a sole disc substrate 101, on one major surface of which an information recording area is formed. This disc substrate 101 has a centrally arranged inner rim holding portion 102, in which no information signals are recorded, a recording area 103 radially outwardly of the inner rim holding portion 102, in which to record information signals, and an outer rim side non-recording area 104 radially outwardly of the recording area 103, in which no information signals are recorded. The optical disc 91, constructed as described above, has its information signal recording major surface, that is the recording and/or reproducing surface, smaller in outer diameter than the opposite side major surface where no information signals are recorded, such that the outer rim of the optical disc 91 presents a beveled surface, with the optical disc 91 being substantially frusto-conical in cross-section.

On the upper cartridge half 92 or on the lower cartridge half 93 is formed a disc housing wall section 110 constituted by plural arcuate wall sections lying on the same circumference of a circle. The disc housing wall section 110 is formed as an inclined wall section which is in meeting with the outer shape of the optical disc 91 and slightly larger than the outer diameter of the optical disc 91. When the upper and lower cartridge halves 92, 93 are combined together, the disc housing wall section 110 delimits therein a disc housing section 111. Thus, the disc housing section 111 limits the amount of movement of the optical disc 91 housed within the main cartridge body portion 94.

The side of the main cartridge body portion 94 opposite to its front side carrying the shutter 16 is formed with a disc insertion/takeout aperture 95. When the disc cartridge 90 is not in use, that is when the disc cartridge 90 is not loaded on the disc recording and/or reproducing apparatus, the disc insertion/takeout aperture 95 is closed by the lid 40 mounted for opening/closure on the rear side of the main cartridge body portion 94.

The disc insertion/takeout aperture 95 has retention portions 113 on both lateral side ends of the upper cartridge half 92 so that it has a substantially frusto-conical shape corresponding to the cross-sectional shape of the optical disc 91. These retention portions 113 are formed as ribs on both lateral side ends of the upper cartridge half 92. This disc insertion/takeout aperture 95 has the size of the long side on the side of the upper half cartridge 92 slightly larger than the diameter of the major surface of the disc 91 corresponding to its recording and/or reproducing surface and the size of the long side on the side of the lower half cartridge 93 slightly larger than the size of the opposite side major surface of the optical disc 91, with the size along the height of the aperture being slightly larger than the thickness of the optical disc 91.

The disc insertion/ejection aperture 95, constructed as described above, is in communication with the inside of the disc housing section 80 of the main cartridge body portion 111. This prevents the optical disc 91 from being inserted in a mistaken manner into the disc housing section 111 via the disc insertion/ejection aperture 95. When inserting the optical disc 91 into the disc housing section 111, such insertion of the optical disc 91 is enabled only when the optical disc is inserted via the disc insertion/ejection aperture 95 with the side of the recording and/or reproducing major surface of the optical disc 91 being set towards the upper cartridge 92 of the disc insertion/ejection aperture 95 and with the side of the opposite major surface of the optical disc 91 being set towards the lower cartridge half 93. Conversely, should the optical disc 91 be inserted into the disc insertion/ejection aperture in the reversed front-reverse side position reversed from the position for normal insertion, that is, with the side of the recording and/or reproducing major surface of the optical disc 91 being set towards the lower cartridge 92 of the disc insertion/ejection aperture 95 and with the side of the opposite major surface of the optical disc 91 being set towards the upper cartridge half 93, the optical disc 91 cannot be inserted into the disc housing section 111.

The optical disc housed within the disc cartridge 90 can be exchanged with a new one when the disc cartridge is not in use, that is, when the disc cartridge is not loaded on the recording and/or reproducing apparatus. In this case, with the lid 40 opened and with the disc insertion/takeout aperture 95 facing to the outside, the disc cartridge is tilted, with the aperture 95 facing downwards. The optical disc 61 can then be slid and taken outwards. For accommodating the optical disc 91 in the main cartridge body portion 94, the recording and/or reproducing major surface of the optical disc 61 is set towards the upper cartridge half side of the disc insertion/takeout aperture 95, while the opposite side major surface of the disc is set towards the lower cartridge half side of the second aperture 83b, with the lid 40 closed. The optical disc 1 is inserted in this state via the disc insertion/ takeout aperture 95 into the main cartridge body portion 94. Since the disc insertion/ejection aperture 95 is formed so as to be larger in size than the cross-sectional area of the optical disc 91 as a whole and is opened in the frusto-conical shape, there is no risk of the optical disc 1 being inserted upside-down. Therefore, with the present disc cartridge 90, there is no risk of the user inadvertently inserting the optical disc 91 into the main cartridge body portion 94, with the recording and/or reproducing side not desired to be recorded or reproduced set in the recording and/or reproducing position, while there is also no risk of inadvertent erasure of the desired information signals recorded on the optical disc 1.

In the above-described disc cartridge 90, it is assumed that the disc housing section 111 formed in the main cartridge body portion 94 is in the frusto-conical shape similar to the shape of the disc insertion/takeout aperture 83. It should however be noted that the disc housing section 111 may also be of rectangular cross-section, with the size of the disc housing wall section 110 of the upper cartridge half 92 and the lower cartridge half 93 slightly larger than the outer dimension of the optical disc 91 and with the height of the housing wall section 110 slightly larger than the thickness of the optical disc 91,.

An optical disc and a disc cartridge according to a fifth embodiment of the present invention will now be explained. First, a disc cartridge 120 according to the fifth embodiment is explained by referring to FIGS. 18 to 20. In the following description, it is assumed that the optical disc 2 of the second embodiment is accommodated in the disc cartridge 120.

The present disc cartridge 120 is made up of a main cartridge body portion 121 in the shape of a box of a thin thickness as a whole and having one of the major surfaces thereof opened, and a lid 122 for closing the opened major surface of the main cartridge body portion 121. The optical disc 2 can be inserted into and remote from the disc cartridge 120 by opening/closing the lid 122. The optical disc 2 in this case is a recordable optical disc capable of recording information signals.

Figure 18:
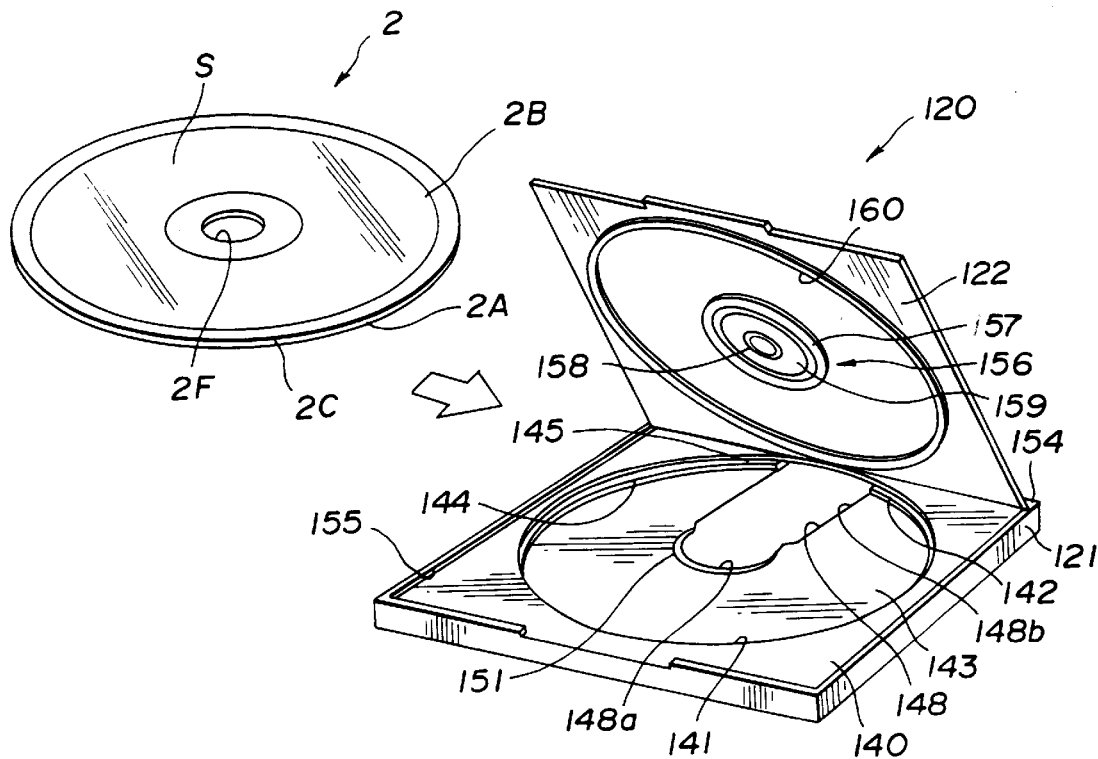
FIG. 18 is a perspective view showing a disc cartridge according to a fifth embodiment of the present invention.

The main cartridge body portion 121 is formed of a synthetic resin of high moldability and sufficient mechanical strength, such as ABS resin, substantially in the shape of a box of a reduced thickness, as shown in FIG. 18. In a mid portion of a major surface 140 of the main cartridge body portion 121 is formed a circular recess operating as a disc housing section 141 for accommodating the optical disc 2.

The disc housing section 141 is formed so as to be slightly larger than the outer dimension of the optical disc 2. On the rim of the disc housing section 141 is formed a toroidal rib-shaped retention portion 142. The retention portion 142 is step-shaped such that a first upstanding wall section 144 from a bottom surface 143 of the disc housing section 141 is of a height slightly larger than the thickness of the disc substrate 24. In continuation to the first upstanding wall section 144 is formed a setting surface 145 parallel to the bottom surface 143. In continuation to the setting surface 145 is formed a second upstanding wall section 146. The retention portion 142 is formed in meeting with a step 2C of the optical disc 2. The disc housing section 141 limits the amount of movement of the optical disc 2 housed within the main cartridge body portion 121.

The bottom surface 143 of the disc housing section 141 is formed with a window 148 extending from a mid portion towards an outer side of the main cartridge body portion 121 fitted with the lid 122. This window 148 is made up of a disc table intrusion opening 148a corresponding in shape to the disc table provided in the recording and/or reproducing apparatus when the disc cartridge 120 is loaded on the recording and/or reproducing apparatus, and a rectangular-shaped recording and/or reproducing opening 148b for exposing to outside a portion of at least the recording area S of the optical disc 2 across the inner and outer rims thereof from the disc table intrusion opening 148a towards the outer side of the main cartridge body portion 121 fitted with the lid 122.

On a rim of the disc table intrusion opening 148a is formed a rib operating as a setting surface 151 on which the optical disc 2 is set when the disc cartridge 120 is not in use. That is, when the disc cartridge 120 is not in use, the inner rim holding portion of the disc substrate 2A is abutted against the setting surface 151.

In register with this window 148 is mounted a shutter configured for being opened on loading the disc cartridge 120 on the recording and/or reproducing apparatus and for being closed during non-use of the disc cartridge 120 for preventing intrusion of dust and dirt into the disc housing section 141 and deposition thereof on the optical disc 2 housed therein and for preventing the user's hand or finger's from touching the recording area S of the optical disc 2.

The lid 122 is pivotally mounted for opening/closure on a rear wall surface section 154 constituting an outer peripheral wall section of the main cartridge body portion 121. The lid 122 is molded from, for example, a transparent synthetic resin material, and is fitted in an recess 155 formed in a major surface of the main cartridge body portion 121. The inner surface of the lid 122 facing the recess 155 is provided with a disc clamper 156 facing the disc table intrusion opening 148a.

The disc clamper 156 includes an outer peripheral rib 157 supporting the inner rim holding portion of the optical disc 2, an inner peripheral rib 158 fitted in a center aperture 2F of the optical disc 2, and a chuck plate 159 loosely fitted in the outer peripheral rib 157 and the inner peripheral rib 158. The chuck plate 159 clamps the inner rim holding portion of the optical disc 2 along with the disc table intruded via disc table intrusion opening 148a. The chuck plate 159 is formed as a disc of synthetic resin material having enclosed therein a magnetic metal plate for enabling magnetic chucking by a magnet mounted on the disc table.

On the inner surface of the lid 122 is protuberantly formed a rib 160 in register with the outer peripheral non-recording area of the optical disc 2. The rib 160 limits vertical vibrations of the optical disc 2 in the closed state of the lid 122.

When the above-described disc cartridge 120, having enclosed therein the optical disc 2, is loaded on the recording and/or reproducing apparatus, the disc table on the side of the recording and/or reproducing apparatus is intruded into the disc table intrusion opening 148a for clamping the optical disc 2 along with the disc damper 156 on the lid 122 for rotationally driving the optical disc 2.

The optical disc housed within the disc cartridge 120 can be exchanged with a new one when the disc cartridge is not in use, that is when the disc cartridge is not loaded on the recording and/or reproducing apparatus. In this case, the optical disc 2 can be exchanged with the lid 122 in an opened state.

Figure 19:
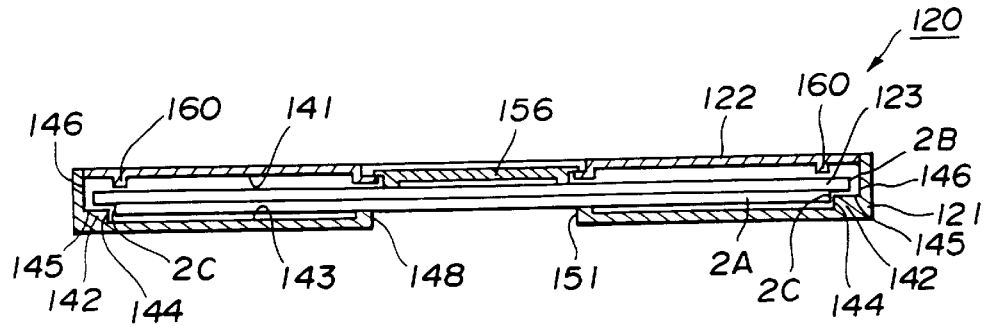
FIG. 19 is a cross-sectional view showing the state in which an optical disc has been correctly housed within a disc cartridge according to the fifth embodiment of the present invention.

For accommodating the optical disc 2 in the main cartridge body portion 121, the optical disc is accommodated in the disc housing section 141, with the disc substrate 2A of the optical disc 2 facing downwards, that is, towards the bottom surface 143 of the disc housing section 141 of the cartridge main body portion 121, with the lid 122 remaining closed, as shown in FIG. 19. At this time, the disc housing section 141 is engaged with the retention portion 142 in register with the step 2C of the optical disc 2. In this case, the lid 122 is closed by being positively fitted in the recess 155.

Figure 20:
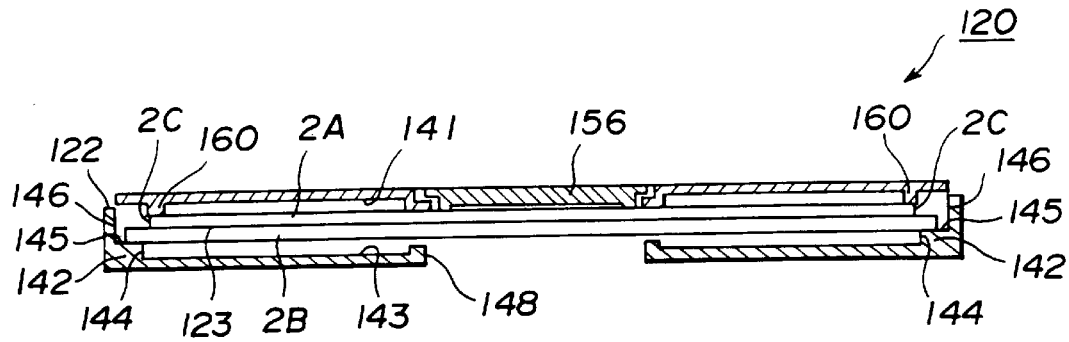
FIG. 20 is a cross-sectional view showing the state in which the optical disc has been housed in an incorrect state in the disc cartridge according to the fifth embodiment of the present invention.

Conversely, should the optical disc 2 be accommodated within the disc housing section 141 with the disc substrate 2B of the optical disc 2 directed downwards, that is, towards the bottom surface 143 of the disc housing section 141 of the main cartridge body portion 121, as shown in FIG. 20, the disc substrate 2B is set on the setting surface 145 without the step 2C of the optical disc 2 becoming engaged with the retention portion 142. Thus, the disc substrate 2A is protruded via the recess 155 of the main cartridge body portion 121, without the lid 122 becoming closed.

With the above-described disc cartridge 120, there is no risk of the optical disc 2 being erroneously inserted in the upside-down position. Therefore, with the present disc cartridge 120, there is no risk of the user inadvertently inserting the optical disc 120 into the main cartridge body portion 121, with the recording and/or reproducing side not desired to be recorded or reproduced set in the recording and/or reproducing position, while there is also no risk of inadvertent erasure of the desired information signals recorded on the optical disc 2.

A sixth embodiment of the disc cartridge is now explained. A disc cartridge 260 of the sixth embodiment includes a mistaken recording inhibiting mechanism 263 mounted on a lid 262 closing a disc insertion/takeout aperture 261. The portions or components used in common with the disc cartridge 10 are denoted by the same reference numerals and the corresponding description is omitted for simplicity.

Figure 21:
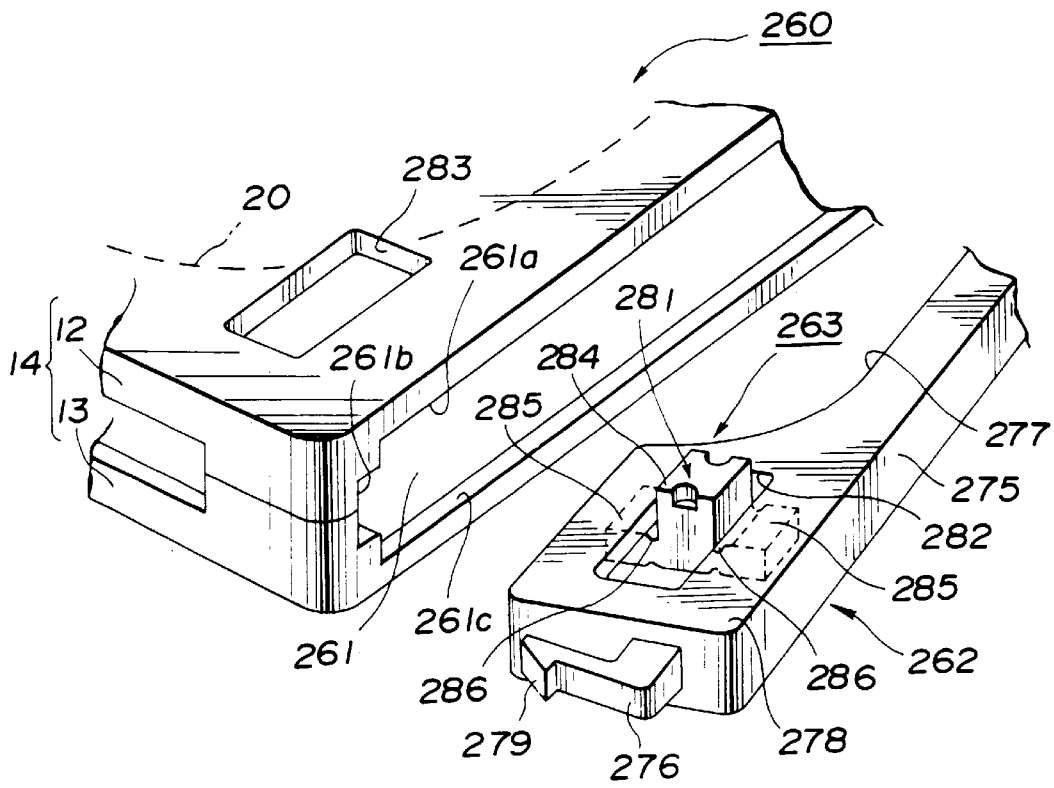
FIG. 21 is a schematic perspective view showing a mistaken recording inhibiting mechanism for a disc cartridge according to a sixth embodiment of the present invention.

Referring to FIG. 21, the rear lateral side of the main cartridge portion 14 has a disc insertion/takeout aperture 261 via which is inserted an optical disc 1 explained with reference to FIGS. 4 and 5. The disc insertion/takeout aperture 261 has a first aperture portion 261a having the size of the long side slightly larger than the diameter of the lesser-diameter disc substrate 1B and the size of the short side slightly larger than the thickness of the disc substrate 1B, a second aperture portion 261b having the size of the long side slightly larger than the diameter of the larger-diameter disc substrate 1A and the size of the short side slightly larger than the thickness of the disc substrate 1A, and a third aperture portion 261c configured similarly to the first aperture portion 261a. The optical disc 1 having the cross-sectional shape of a rectangle having a raised quadrangular center portion can be accommodated via the disc-insertion/takeout aperture 261 with the disc substrate 1B directed upwards or with the disc substrate 1A directed upwards.

The lid 262 closing the disc-insertion/takeout aperture 261 has a main portion 275 closing the disc-insertion/takeout aperture 261, a hinge formed at an end of the main portion 275 and a retention piece 276 formed at the opposite end of the main portion 275.

The main portion 275 has a closing surface 277 on its side facing the disc insertion/takeout aperture 261. The closing surface 277 is formed on the same arcuate surface as the lateral side edge of the optical disc 1. When the lid 262 has closed the disc-insertion/takeout aperture 261, the lid defines the disc housing section 20 along with the inner surfaces of the cartridge halves 12, 13. On the major surface 278 of the main portion 275 is mounted the mistaken recording inhibiting mechanism 263. When the lid 262 has closed the disc-insertion/takeout aperture 261, the main portion 275 is flush with the major surface and the lateral side of the main cartridge body portion 14. On the opposite end of the main portion 275, the retention piece 276 is formed integrally with the main portion 275. A retention piece 279 is formed at the distal end of the retention piece 276.

The above-described lid 262, when closing the disc-insertion/takeout aperture 261, is engaged with a protrusion, not shown, formed at the opposite end of the disc insertion/takeout aperture 261 of the main cartridge body portion 14, so that the lid 262 is not accidentally opened by vibrations produced during transport of the disc cartridge 260. When the lid 262 opens the disc-insertion/takeout aperture 261, the retention piece 276 becomes disengaged from the protrusion of the main cartridge body portion 14 as a result of the opening movement.

The mistaken recording inhibiting mechanism 263 is made up of a mistaken recording inhibiting member 281, mounted on the lid 262, an opening 282 formed in the major surface 278 of the lid 262 for exposing the mistaken recording inhibiting member 281 to outside, and a control opening 283 formed in the upper cartridge half 12.

The mistaken recording inhibiting member 281 has an actuating portion 284 and a retention portions 285 which is formed on both sides of the actuating portion 284. The retention portion 285 has a cut-out 286 extending in the direction of thickness at a junction area to the actuating portion 284.

The opening 282 and the control opening 283 are formed as elongated openings extending along the lateral side of the main cartridge portion 14 in which is formed the disc insertion/takeout aperture 261. These openings 282, 283 permit the actuating portion 284 of the mistaken recording inhibiting member 281 to be exposed to the outside, while permitting the mistaken recording inhibiting member 281 to be slid therein.

With the above-described mistaken recording inhibiting mechanism 263, if the lid 262 closes the disc insertion/takeout aperture 261, the actuating portion 284 is exposed to the outside via control opening 283. Therefore, the lid 262 is locked by the mistaken recording inhibiting member 281 against actuation in the opening direction. When the disc cartridge 260 is loaded on the recording and/or reproducing apparatus, the mistaken recording inhibiting member 281 inhibits intrusion of a detection portion of the mistaken recording detection means, not shown, provided on the recording and/or reproducing apparatus, thus inhibiting writing of new information signals on the optical disc 1.

If the lid 262 is actuated in the opening direction, first the retention portion 285 of the mistaken recording inhibiting member 281 is removed. Since the retention portion 285 is formed with the actuating portion 284 via the cut-out 286, it can be easily removed by thrusting the actuating portion 284 from above. Since the retention portion 285 is removed from the openings 282, 283, it becomes possible for the mistaken recording inhibiting member 281 to unlock the lid 262 to enable the opening of the lid 262.

If the disc cartridge 260, with the mistaken recording inhibiting member 281 thus constructed, is loaded on the recording and/or reproducing apparatus, the detection portion of the mistaken recording detection means provided on the apparatus is intruded into the openings 282, 283 to permit writing of new information signals on the optical disc 1.

Thus, if the optical disc 1 is not taken out of the disc cartridge 260 even once, it becomes possible for the user to recognize that writing of new information signals is inhibited. If the user takes out the optical disc 1 out of the disc cartridge 260 even once, the user can recognize that writing of new information signals has been enabled.

A seventh embodiment of the disc cartridge is now explained.

In a disc cartridge 290 of the seventh embodiment, an auxiliary member of the mistaken recording inhibiting mechanism 291 is mounted on a lid 292 adapted for closing the disc insertion/takeout aperture 17, as shown in FIG. 22. The present embodiment is otherwise the same as the disc cartridge 10 shown in FIGS. 9 to 11.

The lid 292 closing the disc insertion/takeout aperture has a main portion 293 for closing the disc insertion/takeout aperture 17, a hinge, not shown, formed at an end of the main portion 293, and a retention piece 294 formed at the opposite end of the main portion 293.

The side of the main portion 293 facing the disc insertion/takeout aperture is formed with a closing surface 295. The closing surface 295 is formed to have the same arcuate surface as the lateral side edge of the optical disc 1. When the lid 292 has closed the disc insertion/takeout aperture, the lid forms a part of the disc housing section 20. On the major surface 296 of the main portion 293 is arranged the mistaken recording inhibiting mechanism 291. When the lid 292 has closed the disc insertion/takeout aperture, the main portion 293 is flush with the major surface and the lateral side of the main cartridge body portion 14. The retention piece 294, formed at the opposite end of the of the main portion 293, is formed integrally with the main portion 293, and has at its distal end a retention portion 297.

When the above-described lid 292 has closed the disc insertion/takeout aperture, the retention portion 297 is engaged with a protrusion, not shown, formed at the opposite end of the disc insertion/takeout aperture of the main cartridge body portion 14, for preventing the lid from being opened even under vibrations produced during transport of the disc cartridge 290. When the disc insertion/takeout aperture is opened, the retention piece 294 is unlocked to permit opening of the lid 292.

The mistaken recording inhibiting mechanism 291 is made up of a mistaken recording inhibiting member 301, mounted on the lid 292, an opening 302 formed in the major surface 296 of the lid 292 for exposing the mistaken recording inhibiting member 301 to outside, a connecting piece 303 for connecting the mistaken recording inhibiting member 301 to the opening 302 and a control opening, not shown, formed in the upper cartridge half 12. The connecting piece 303 is formed as a thin sheet so as to be destroyed on being thrust by the mistaken recording inhibiting member 301.

With the above-described mistaken recording inhibiting mechanism 291, if the lid 292 has closed the disc insertion/takeout aperture, the mistaken recording inhibiting member 301 is exposed to outside via an opening, not shown, in the upper cartridge half 12. Therefore, the lid 292 is locked by the mistaken recording inhibiting member 301 against being actuated in the opening direction. With the mistaken recording inhibiting member 301, the detection portion of the mistaken recording detection means of the recording and/or reproducing apparatus is prohibited from being intruded if the disc cartridge 290 is loaded on the recording and/or reproducing apparatus, thus inhibiting writing of new information signals on the optical disc 1.

When actuating the lid 292 in the opening direction, the connecting piece 303 of the mistaken recording inhibiting member 301 is first destroyed. The connecting piece 303 is destroyed by the inhibiting member 301 being thrust from above. Since the connecting piece 303 is destroyed, the mistaken recording inhibiting member 301 is removed from the opening 302. The result is that the lid 292 becomes unlocked and hence the lid 292 can be opened.

If the disc cartridge 290, from which the mistaken recording inhibiting member 301 has been cut off, is loaded on the recording and/or reproducing apparatus, the detection portion of the mistaken recording detection means of the recording and/or reproducing apparatus can be intruded into the opening 302 and the control opening, not shown, of the upper cartridge half 12, so that new information signals can be written on the optical disc 1. Thus, if the optical disc 1 has never been taken out of the disc cartridge 290, the user can recognize that writing of new information signals is inhibited. Once the user has taken out the optical disc 1 from the disc cartridge 290, he or she can recognize that writing of new information signals has been enabled.

With the above-described lid 292, an auxiliary member 305 of the mistaken recording inhibiting member 301 is provided as one with the major surface 296 of the lid. This auxiliary member 305 is mounted in the opening 302 once the mistaken recording inhibiting member 301 has been removed. The auxiliary member 305 is made up of an operating member 306 and an elastic piece 307 protruded from a lateral edge of the operating member 306, and is connected to the main portion 293 by a connection piece 308. The auxiliary member 305 is of the same outer shape as the mistaken recording inhibiting member 301. The elastic piece 307 is protruded from the rim of the mistaken recording inhibiting member 301 so as to be slightly larger in size than the opening 302.

When mounted in the opening 302, the auxiliary member 305 is first cut off from the connection piece 308. At this time, the auxiliary member 305 is cut off by warping upwards or downwards. The auxiliary member 305, thus cut off, is mounted by being pushed into the opening 302 by flexure of the elastic piece 307. The elastic piece 307 is slightly larger in size than the opening 302, so that, by thrusting the auxiliary member 305, the elastic piece 307 is elastically displaced so as to be intruded into the opening 302. Since the elastic piece 307 is slightly larger in size than the opening 302 and is engaged with the peripheral wall of the opening 302, there is no risk of inadvertent removal of the elastic piece 307 from the opening 302 during transport of the disc cartridge 290. By using the auxiliary member 305 in this manner, it becomes possible to re-use the disc cartridge 290.

An eighth embodiment of the disc cartridge is now explained. A disc cartridge 320 of the eighth embodiment includes a mistaken recording inhibiting mechanism 322 in the vicinity of a disc insertion/takeout aperture 321 of the main cartridge body portion 14, as shown in FIG. 23. The portions or components used in common with the disc cartridge 10 are denoted by the same reference numerals and the corresponding description is not made for simplicity.

Into the disc insertion/takeout aperture 321 formed in the rear lateral side of the main cartridge body portion 14 is introduced the optical disc 1 shown in FIGS. 4 and 5. The disc insertion/takeout aperture 321 is rectangular in shape and dimensioned so that its long side is slightly larger than the diameter of the larger-diameter disc substrate 1A and its short side is slightly larger than the sum of the thicknesses of the disc substrates 1A and 1B. The disc insertion/takeout aperture 321 is configured so that the optical disc 1 having the cross-section of a rectangle stepped at both lateral edges may be inserted into the disc housing section without regard to whether the disc substrate 1B is directed upwards or the disc substrate 1A is directed upwards.

The disc insertion/takeout aperture 321 is opened or closed by the lid 40 of the disc cartridge 1 shown in FIGS. 9 to 11.

The mistaken recording inhibiting mechanism 322 is made up of a retention piece 325 limiting the position of the optical disc 1, a mistaken recording inhibiting member 326 mounted as one with the retention piece 325 and a control opening 327 formed in the upper and lower cartridge halves 12, 13.

The retention piece 325 is substantially elliptical in shape and has its one end fulcrumed by a pivot 330 formed on the upper and lower cartridge halves 12, 13 so that the retention piece will be turned in the directions indicated by arrows C and D in FIG. 23.

The retention piece 325 has at its opposite end a hole 328 in the mistaken recording inhibiting member 326 is mounted by plural connecting pieces 329 as one with the retention piece 325. A recessed engagement portion 331 is formed in the upper surface of the mistaken recording inhibiting member 326. The mistaken recording inhibiting member 326 has its both ends exposed to outside via control openings 327 formed at the corner of the upper and lower cartridge halves 12, 13 in the vicinity of the disc insertion/takeout aperture 321. The mistaken recording inhibiting member 326 can be cut off by inserting and rotating a female driver in the engagement portion 331. Once the mistaken recording inhibiting member 326 is cut off, no information signals can be recorded on an optical disc contained in the disc cartridge even if the optical disc is exchanged.

The control opening 327 is formed in an arcuate shape with the long side of the arc extending parallel to the lateral side of the main cartridge body portion 14 in which the disc insertion/takeout aperture 321 is formed. The mistaken recording inhibiting member 326 is actuated in the direction indicated by arrows C and D in FIG. 23 along the control opening 327 for rotating the retention piece 325.

The above-described mistaken recording inhibiting mechanism 322 being in the first position, indicated V in FIG. 23, indicates that the retention piece 325 locks the lateral side edge of the disc 1, and that the mistaken recording inhibiting member 326 inhibits writing of new information signals. The above-described mistaken recording inhibiting mechanism 322 being in the second position, indicated W in FIG. 23, as a result of the sliding movement of the mistaken recording inhibiting member 326, indicates that the locked state of the lateral side edge of the disc 1 by the retention piece 325 is released to enable the disc 1 to be taken out of the disc insertion/takeout aperture 321, with the mistaken recording inhibiting member 326 permitting writing of new information signals. If the mistaken recording inhibiting member 326 has been cut off as described above, the mistaken recording detection means on the recording and/or reproducing apparatus deems that recording is disabled. Thus, even in case of disc exchange, no information signals can be inadvertently recorded on an exchanged disc.

With the above-described disc cartridge 320, if the disc 1 has been taken out of the disc cartridge 320, the mistaken recording inhibiting member 326 of the mistaken recording inhibiting mechanism 322 is simultaneously brought to the second position indicated W in FIG. 23, the user can recognize that the writing on the disc 1 is enabled.

On the other hand, if the disc 1 is housed within the disc cartridge 320, the mistaken recording inhibiting member 326 of the mistaken recording inhibiting mechanism 322 is brought to the first position indicated V in FIG. 23. Thus the user can recognize that the writing on the disc 1 is now disabled.

The present invention may be modified in many ways without departing from the spirit and purpose of the invention.

What is claimed is:

1. A disc cartridge accommodating a disc comprised of two disc substrates bonded together, said disc being non-symmetrical in cross-section about a bonding center line, comprising:

a main cartridge body portion forming a disc housing and having an aperture via which to insert and take out said disc to and from said disc housing and further having two rib-like retainers extending from said aperture into said disc housing, so that said aperture is formed to have a shape substantially identical to the non-symmetrical cross-section of the disc and so that said aperture is configured for accommodating said disc only in one orientation corresponding to a state of permitting recording and/or reproduction of said disc; and an opening/closure mechanism for opening/closing said aperture, including a takeout inhibiting mechanism specifying whether recording on said disc is possible, said takeout inhibiting mechanism inhibiting takeout of said disc from said main cartridge body portion and including a discriminating member for specifying a state of inhibiting recording on the disc upon being moved to a first position of being exposed to the outside through a control opening formed in said main cartridge body portion and for specifying a state of possible recording on the disc upon being moved to a second position exposed to the outside through said control opening, and wherein said inhibiting mechanism, when moved to said first position is engaged with and retains said disc.

2. The disc cartridge as claimed in claim 1, wherein said aperture has a shape corresponding to a cross-sectional shape of said disc so as to permit insertion and ejection of said disc only in said state of permitting recording and/or reproduction of said disc.

3. The disc cartridge as claimed in claim 1, wherein said aperture includes a retention portion adapted for locking said disc when said disc is inserted in a state of not permitting recording and/or reproduction of the disc.

4. The disc cartridge as claimed in claim 1, wherein said aperture is formed in a lateral side of said main cartridge body portion and said opening/closure mechanism includes an opening/closure member rotatably mounted on said main cartridge body portion for opening/closing said aperture.

5. A disc cartridge accommodating a disc comprised of two disc substrates bonded together, said disc being non-symmetrical in cross-section about a bonding center line, comprising:

a main cartridge body portion forming a disc housing and having an aperture via which to insert and take out said disc to and from said disc housing and further having two rib-like retainers extending from said aperture into said disc housing, so that said aperture has a shape substantially identical to the non-symmetrical cross-section of the disc, whereby said aperture is configured for accommodating said disc only in one orientation corresponding to a state of permitting recording and/or reproduction of said disc; and an opening/closure mechanism for opening/closing said aperture, including a takeout inhibiting mechanism specifying whether recording on said disc is possible, said takeout inhibiting mechanism, when in a state of inhibiting recording on the disc, inhibiting takeout of the disc from said main cartridge body portion, and the opening/closing movement of the opening/closure mechanism being inhibited when said inhibiting mechanism specifies a state of inhibiting recording on said disc, said takeout inhibiting mechanism including a discriminating member specifying whether recording on the disc is possible, said discriminating member being mounted for movement between a first position specifying the state of inhibiting recording on said disc and a second position specifying a state of possible recording on said disc, and wherein said main cartridge body includes a discrimination opening into which said discrimination member is intruded.

6. A disc cartridge accommodating therein a disc non-symmetrical in cross-sectional shape relative to a center line of the disc in a thickness direction, comprising:

a main cartridge body portion forming a disc housing and having an aperture via which to insert or take out a disc to and from said disc housing and further having two rib-like retainers extending from said aperture into said disc housing, so that said aperture has a shape substantially identical to the non-symmetrical cross-section of the disc, whereby said aperture is formed for accommodating the disc only in one orientation corresponding to a state permitting recording and/or reproduction of the disc; and an opening/closure mechanism for opening/closing said aperture, including a takeout inhibiting mechanism for specifying whether recording on the disc is possible and when in the state of inhibiting recording on the disc for inhibiting takeout of said disc from said main cartridge body portion, said takeout inhibiting mechanism including a discriminating member movably mounted on said opening/closing mechanism for specifying whether recording on the disc is possible and being mounted for movement to a first position of being exposed through a control opening when specifying the state of inhibiting recording and for movement to a second position of being exposed through said control opening when specifying the state of possible recording, wherein said discriminating member, when moved to said first position is engaged with and retains the disc.

7. The disc cartridge as claimed in claim 6, wherein said aperture has a shape corresponding to a cross-sectional shape of the disc for enabling insertion or takeout of the disc only in the state permitting recording and/or reproduction to the disc.

8. The disc cartridge as claimed in claim 6, wherein said aperture includes a retention portion for locking the disc when inserted in a state of not permitting recording and/or reproduction of the disc.

9. The disc cartridge as claimed in claim 6, wherein said aperture is formed in a lateral side of said main cartridge body portion and wherein said opening/closure mechanism includes an opening/closure member rotatably mounted on said main cartridge body portion for opening/closing said aperture.

10. The disc cartridge as claimed in claim 6, wherein the opening/closing movement of the opening/closure mechanism is inhibited when said takeout inhibiting mechanism specifies the state of inhibiting recording on the disc.

11. The disc cartridge as claimed in claim 10, wherein said discriminating member is mounted for movement between a first position specifying the state of inhibiting recording on the disc and a second position specifying the state of possible recording on the disc.

12. The disc cartridge as claimed in claim 11 wherein said main cartridge body portion includes a discrimination opening via which said discriminating member is intruded.

* * * * *